United States Patent
Trepanier et al.

(10) Patent No.: US 12,374,204 B2
(45) Date of Patent: Jul. 29, 2025

(54) SYSTEM AND METHOD FOR DISPLAYING VIDEO FEED INFORMATION ON A USER INTERFACE

(71) Applicant: GENETEC INC., Saint-Laurent (CA)

(72) Inventors: Jean-David Trepanier, St-Hubert (CA); Mathieu Brault, Saint-Basile-le-Grand (CA)

(73) Assignee: GENETEC INC., Saint-Laurent (CA)

( * ) Notice: Subject to any disclaimer, the term of this patent is extended or adjusted under 35 U.S.C. 154(b) by 0 days.

(21) Appl. No.: 18/026,724

(22) PCT Filed: Oct. 27, 2021

(86) PCT No.: PCT/CA2021/051514
§ 371 (c)(1),
(2) Date: Mar. 16, 2023

(87) PCT Pub. No.: WO2023/070190
PCT Pub. Date: May 4, 2023

(65) Prior Publication Data
US 2024/0290187 A1    Aug. 29, 2024

(51) Int. Cl.
*G08B 13/196* (2006.01)
*G06V 20/40* (2022.01)

(52) U.S. Cl.
CPC ....... *G08B 13/19682* (2013.01); *G06V 20/44* (2022.01); *G08B 13/19673* (2013.01); *G08B 13/19691* (2013.01)

(58) Field of Classification Search
CPC ........ G08B 13/19682; G08B 13/19673; G08B 13/19691; G06V 20/44; G11B 27/105; G11B 27/34; H04N 7/181; H04N 21/44008; H04N 21/4312; H04N 21/2187; H04N 21/488
USPC ......................................................... 386/282
See application file for complete search history.

(56) References Cited

U.S. PATENT DOCUMENTS

| | | | |
|---|---|---|---|
| 9,456,170 B1* | 9/2016 | Miller | G11B 27/10 |
| 9,990,111 B2* | 6/2018 | Tan | G06F 3/1423 |
| 2004/0006575 A1* | 1/2004 | Visharam | H04N 21/23424 |
| 2007/0156786 A1* | 7/2007 | May | G06F 11/3476 |
| 2011/0271236 A1 | 11/2011 | Jain | |
| 2014/0169766 A1* | 6/2014 | Yu | G11B 27/34 386/282 |

(Continued)

FOREIGN PATENT DOCUMENTS

JP    2010272908    12/2010

*Primary Examiner* — Helen Shibru
(74) *Attorney, Agent, or Firm* — NORTON ROSE FULBRIGHT CANADA LLP

(57) ABSTRACT

There is provided a system and a method for displaying information related to a video feed on a user interface. The video feed corresponding to video captured by a video camera provided at a first location is received and displayed in a first region of the user interface, the user interface rendered on a display of a client device located remotely from the video camera. A video timeline associated with the video feed is displayed in a second region of the user interface. At least one user interface element is superimposed on at least the video timeline and is indicative of occurrence of at least one event associated with the video feed, a position of the at least one user interface element on the video timeline corresponding to a time of occurrence of the at least one event.

22 Claims, 16 Drawing Sheets

(56) References Cited

U.S. PATENT DOCUMENTS

| | | | |
|---|---|---|---|
| 2015/0100349 A1* | 4/2015 | Lacy | G16H 10/60 |
| | | | 705/3 |
| 2018/0012462 A1 | 1/2018 | Heitz et al. | |
| 2019/0361577 A1 | 11/2019 | Burns et al. | |
| 2023/0140701 A1* | 5/2023 | Segal | H04N 7/147 |
| | | | 386/282 |
| 2024/0143482 A1* | 5/2024 | Lim | G06F 11/0781 |

* cited by examiner

SYSTEM AND METHOD FOR DISPLAYING VIDEO FEED INFORMATION ON A USER INTERFACE

FIELD

The improvements generally relate to the field of monitoring and surveillance, and more particularly to displaying information related to a video feed on a user interface.

BACKGROUND

A video surveillance system may have a number of cameras connected to a server for the purposes of transmitting video data to the server. The server may archive the video data, manage and control the cameras, process the video data to perform video analytics, provide access to camera video feeds, for example, to one or more remote workstations or mobile devices for live monitoring or previously recorded viewing of the video feeds.

A user may connect to the server with a desktop application to view the video feeds when the server is an on-premises server. For example, a user may use the Genetec™ Security Desk application to connect to a server running Genetec™ Security Center unified security platform. Similarly, a user may connect to the server with a web application or web browser, for example, when the server is a cloud computing environment. For example, a user may use a web browser to connect to the Stratocast™ cloud-based video management system. While existing on-premises and cloud-based systems can vary in functionality between each other and these systems can also vary in features from version or release, these existing systems commonly provide a graphical user interface (GUI) on a user's computing device that displays one or more video tiles of video feeds, a video timeline for each video tile, and various inputs and/or controls.

Conventionally, these existing systems may detect motion based on image processing of the video feed and may be configured to add a bookmark to a video timeline to indicate motion, among other things that may be detected by these systems. Bookmarks may also be added by users to indicate a note or a tag in the video at a specific time. The bookmarks are typically displayed as a bookmark ribbon tail over the video timeline. A user can select the bookmark, for example by hovering over the bookmark with a mouse, to then have additional information pertaining to the bookmark displayed in the GUI. However, the user may not always notice the display of the bookmark on the video timeline. For example, when the user is live monitoring a large number of video feeds from different cameras, it may be possible for a bookmark to pass by in the video timeline without the user noticing. Furthermore, even if the user sees the bookmark, the user may not know what the bookmark pertains to.

Against this background, there remains a need to provide improvements to existing systems that provide video playback to allowed for improved display of information in GUIs in order to more readily alert or notify users of pertinent information pertaining to the video feed(s) being displayed.

SUMMARY

The following presents a simplified summary of one or more implementations in accordance with aspects of the present disclosure in order to provide a basic understanding of such implementations. The disclosure describes various examples of a user interface element that can be superimposed on a video timeline and/or a display area of a video feed, which may more readily alert or notify a user of pertinent information pertaining to the video feed. In a first specific and non-limiting example, a pop-up element is automatically displayed in the display area of the video feed based on an event associated with the video timeline approaching a current playback time. In a second specific and non-limiting example, a pop-up element is displayed in the display area of the video feed in response to detecting an occurrence of an event in a pre-determined range of a camera providing the video feed. In a third specific and non-limiting example, an icon is displayed in one or both of the video timeline and a pop-up element, where the icon provides a graphical representation of the event. Other examples and embodiments are described herein.

In accordance with one aspect, there is provided a method for displaying information related to a video feed on a user interface. The method comprises receiving the video feed, the video feed corresponding to video captured by a video camera provided at a first location, displaying the video feed in a first region of the user interface, the user interface rendered on a display of a client device located remotely from the video camera, displaying a video timeline associated with the video feed in a second region of the user interface, and superimposing, on at least the video timeline, at least one user interface element indicative of occurrence of at least one event associated with the video feed, a position of the at least one user interface element on the video timeline corresponding to a time of occurrence of the at least one event.

In some embodiments, the at least one user interface element comprises at least one pop-up element displayed at least in part in the first region of the user interface, the at least one pop-up element displayed automatically based on the at least one event associated with the video timeline.

In some embodiments, the at least one pop-up element provides first information of interest about the at least one event.

In some embodiments, the first information of interest about the at least one event comprises at least one of a title associated with the at least one event, a timestamp indicative of the time of occurrence of the at least one event, and a description of the at least one event.

In some embodiments, the first information of interest about the at least one event further comprises at least one of an icon providing a graphical representation of the at least one event, a straight-line distance between the first location and at least one second location at which the at least one event occurred, a radial distance from the first location to the at least one second location, a direction to the at least one second location, and geographical coordinates associated with the at least one second location.

In some embodiments, the at least one pop-up element is displayed for a pre-determined time duration.

In some embodiments, a transparency setting of the at least one pop-up element varies over the pre-determined time duration, from a minimum transparency to a maximum transparency.

In some embodiments, the method further comprises rendering second information of interest about the at least one event on the user interface in response to user interaction of a user input device with the at least one pop-up element.

In some embodiments, the second information of interest comprises at least one of an image associated with the at least one event, audio data associated with the at least one event, a hyperlink pointing to an external source of information relevant to the at least one event, a matrix barcode encoding a link pointing to the external source of information, a matrix barcode encoding an identifier pointing to the external source of information, and location information associated with the at least one event.

In some embodiments, the video feed is a recorded video feed, and the at least one pop-up element is displayed in response to detecting that the time of occurrence of the at least one event is within a pre-determined timeframe of a current playback time of the recorded video feed.

In some embodiments, the video feed is a live video feed, and the at least one pop-up element is displayed in response to detecting, in real-time and based on an event occurrence record obtained from a data source, occurrence of the at least one event.

In some embodiments, the video feed is a live video feed, and the at least one pop-up element is displayed in response to detecting, in real-time and based on an event occurrence record obtained from a data source, occurrence of the at least one event within a pre-determined range of the first location.

In some embodiments, the at least one user interface element further comprises at least one icon displayed in the second region of the user interface adjacent to the at least one pop-up element, the at least one icon providing a graphical representation of the at least one event.

In some embodiments, the at least one user interface element is indicative of occurrence of the at least one event within a pre-determined range of the first location.

In some embodiments, the video feed is a live video feed, and the at least one pop-up element is displayed in response to detecting, in real-time and based on an event occurrence record obtained from a data source, occurrence of the at least one event within the pre-determined range of the first location.

In some embodiments, the at least one user interface element comprises at least one icon displayed in the second region of the user interface, the at least one icon providing a graphical representation of the at least one event.

In some embodiments, the at least one user interface element comprises at least one icon, the at least one icon providing a graphical representation of the at least one event.

In some embodiments, the method further comprises identifying, from a set of a plurality of event types, an event type associated with the at least one event and selecting the at least one icon based on the event type as identified.

In some embodiments, the at least one event comprises a first event having a first event type associated therewith and at least one second event having at least one second event type associated therewith, and a first icon providing the graphical representation of the first event and at least one second icon providing the graphical representation of the at least one second event are displayed in the second region of the user interface, the first event type different from the at least one second event type and the first icon different from the at least one second icon.

In some embodiments, the at least one event comprises a first event having a first event type associated therewith and at least one second event having at least one second event type associated therewith, and a first icon providing the graphical representation of the first event is displayed in a first pop-up element displayed at least in part in the first region of the user interface and at least one second icon providing the graphical representation of the at least one second event is displayed in at least one second pop-up element displayed at least in part in the first region of the user interface, the first event type different from the at least one second event type and the first icon different from the at least one second icon.

In some embodiments, a plurality of icons are superimposed on the video timeline at positions corresponding to times of occurrence of a plurality of consecutive events, and a single pop-up element is displayed adjacent a given one of the plurality of icons, the pop-up element displaying first information of interest about the plurality of consecutive events in a stacked manner.

In accordance with another aspect, there is provided a system comprising a processing unit and a non-transitory computer-readable medium having stored thereon program instructions executable by the processing unit for receiving a video feed corresponding to video captured by a video camera provided at a first location, displaying the video feed in a first region of a user interface, the user interface rendered on a display of a client device located remotely from the video camera, displaying a video timeline associated with the video feed in a second region of the user interface, and superimposing, on at least the video timeline, at least one user interface element indicative of occurrence of at least one event associated with the video feed, a position of the at least one user interface element on the video timeline corresponding to a time of occurrence of the at least one event.

In some embodiments, the at least one user interface element comprises at least one pop-up element displayed at least in part in the first region of the user interface, the at least one pop-up element displayed automatically based on the at least one event associated with the video timeline.

In some embodiments, the at least one pop-up element provides first information of interest about the at least one event.

In some embodiments, the first information of interest about the at least one event comprises at least one of a title associated with the at least one event, a timestamp indicative of the time of occurrence of the at least one event, and a description of the at least one event.

In some embodiments, the first information of interest about the at least one event further comprises at least one of an icon providing a graphical representation of the at least one event, a straight-line distance between the first location and at least one second location at which the at least one event occurred, a radial distance from the first location to the at least one second location, a direction to the at least one second location, and geographical coordinates associated with the at least one second location.

In some embodiments, the at least one pop-up element is displayed for a pre-determined time duration.

In some embodiments, a transparency setting of the at least one pop-up element varies over the pre-determined time duration, from a minimum transparency to a maximum transparency.

In some embodiments, the program instructions are further executable by the processing unit for rendering second information of interest about the at least one event on the user interface in response to user interaction of a user input device with the at least one pop-up element.

In some embodiments, the second information of interest comprises at least one of an image associated with the at least one event, audio data associated with the at least one event, a hyperlink pointing to an external source of information relevant to the at least one event, a matrix barcode encoding a link pointing to the external source of information, a matrix barcode encoding an identifier pointing to the external source of information, and location information associated with the at least one event.

In some embodiments, the video feed is a recorded video feed, and the at least one pop-up element is displayed in response to detecting that the time of occurrence of the at least one event is within a pre-determined timeframe of a current playback time of the recorded video feed.

In some embodiments, the video feed is a live video feed, and the at least one pop-up element is displayed in response to detecting, in real-time and based on an event occurrence record obtained from a data source, occurrence of the at least one event.

In some embodiments, the video feed is a live video feed, and the at least one pop-up element is displayed in response to detecting, in real-time and based on an event occurrence record obtained from a data source, occurrence of the at least one event within a pre-determined range of the first location.

In some embodiments, the at least one user interface element further comprises at least one icon displayed in the second region of the user interface adjacent to the at least one pop-up element, the at least one icon providing a graphical representation of the at least one event.

In some embodiments, the at least one user interface element is indicative of occurrence of the at least one event within a pre-determined range of the first location.

In some embodiments, the video feed is a live video feed, and the at least one pop-up element is displayed in response to detecting, in real-time and based on an event occurrence record obtained from a data source, occurrence of the at least one event within the pre-determined range of the first location.

In some embodiments, the at least one user interface element comprises at least one icon displayed in the second region of the user interface, the at least one icon providing a graphical representation of the at least one event.

In some embodiments, the at least one user interface element comprises at least one icon, the at least one icon providing a graphical representation of the at least one event.

In some embodiments, the program instructions are further executable by the processing unit for identifying, from a set of a plurality of event types, an event type associated with the at least one event and selecting the at least one icon based on the event type as identified.

In some embodiments, the at least one event comprises a first event having a first event type associated therewith and at least one second event having at least one second event type associated therewith, and a first icon providing the graphical representation of the first event and at least one second icon providing the graphical representation of the at least one second event are displayed in the second region of the user interface, the first event type different from the at least one second event type and the first icon different from the at least one second icon.

In some embodiments, the at least one event comprises a first event having a first event type associated therewith and at least one second event having at least one second event type associated therewith, and a first icon providing the graphical representation of the first event is displayed in a first pop-up element displayed at least in part in the first region of the user interface and at least one second icon providing the graphical representation of the at least one second event is displayed in at least one second pop-up element displayed at least in part in the first region of the user interface, the first event type different from the at least one second event type and the first icon different from the at least one second icon.

In some embodiments, a plurality of icons are superimposed on the video timeline at positions corresponding to times of occurrence of a plurality of consecutive events, and a single pop-up element is displayed adjacent a given one of the plurality of icons, the pop-up element displaying first information of interest about the plurality of consecutive events in a stacked manner.

In accordance with yet another aspect, there is provided a non-transitory computer-readable medium having stored thereon program instructions executable by a processor for receiving a video feed corresponding to video captured by a video camera provided at a first location, displaying the video feed in a first region of the user interface, the user interface rendered on a display of a client device located remotely from the video camera, displaying a video timeline associated with the video feed in a second region of the user interface, and superimposing, on at least the video timeline, at least one user interface element indicative of occurrence of at least one event associated with the video feed, a position of the at least one user interface element on the video timeline corresponding to a time of occurrence of the at least one event.

Many further features and combinations thereof concerning embodiments described herein will appear to those skilled in the art following a reading of the instant disclosure.

DESCRIPTION OF THE FIGURES

In the figures.

It will be noticed that throughout the appended drawings, like features are identified by like reference numerals.

DETAILED DESCRIPTION

Described herein are systems and methods for displaying video feed information on a user interface. As will be described further below, the systems and methods described herein may be used to alert user(s) of the occurrence of one or more events associated with a video feed. The systems and methods described herein may be used for a variety of applications. In one embodiment, the systems and methods described herein may be used for monitoring and surveillance. Other embodiments may apply.

Figure 1:
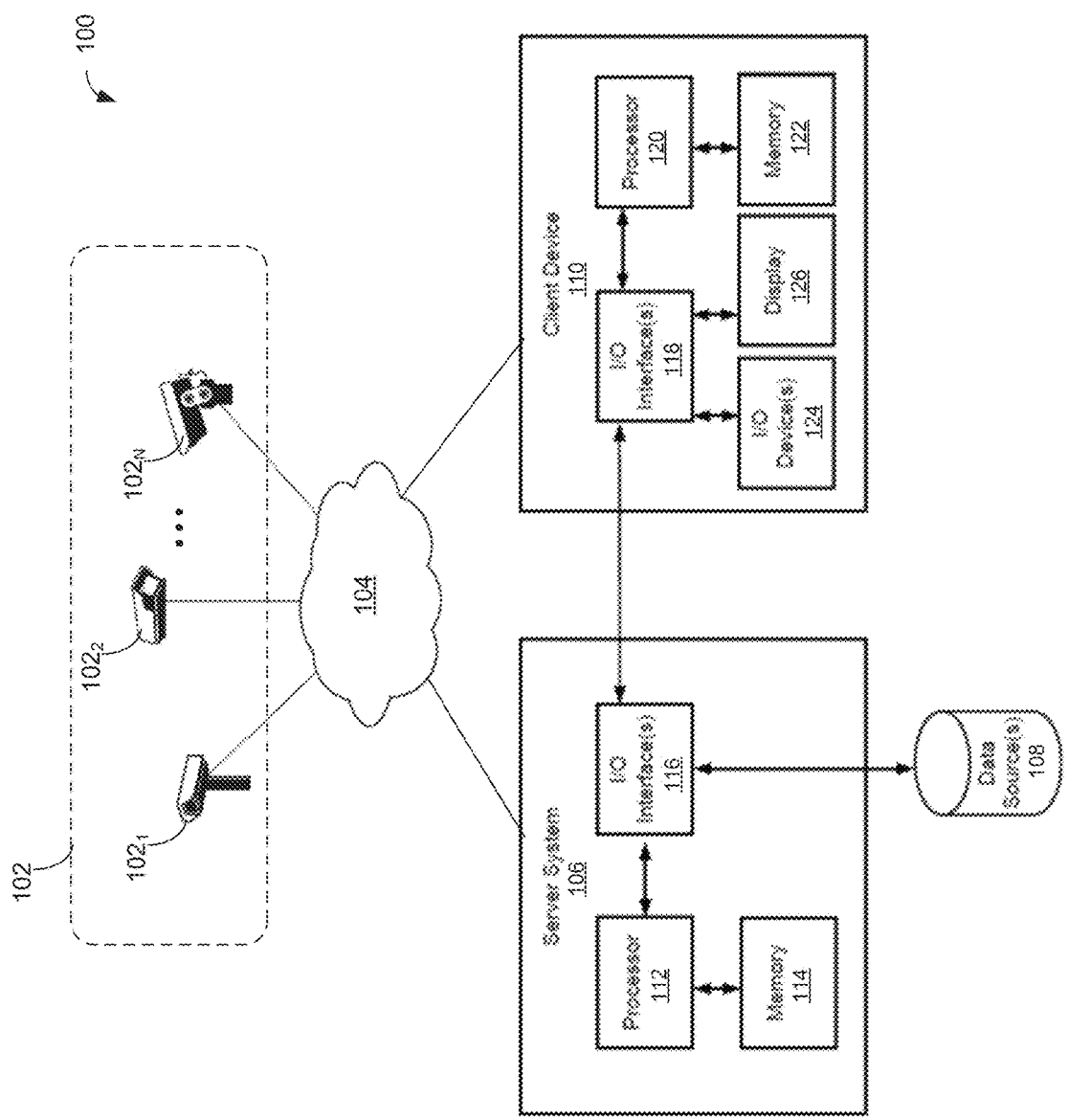
FIG. 1 is a schematic diagram illustrating a system for displaying information related to a video feed on a user interface, in accordance with an illustrative embodiment.

FIG. 1 illustrates an example system 100 for displaying information related to a video feed on a user interface. The system 100 may be an area monitoring system, such as the one described in U.S. Pat. No. 10,885,066, the contents of which are hereby incorporated by reference. The system 100 comprises a number (N) of video cameras 102, for instance cameras $102_1$, $102_2$, . . . , and $102_N$, disposed at various locations within a geographical area. It should be understood that any suitable number of cameras 102 may apply. The cameras are used to monitor objects, events, places, and/or people of interest within the geographical area. When the system 100 comprises several cameras 102, the cameras 102 may be located in close proximity to one another, for instance in the same building or on the same city block, or they may be remote from one another, for instance, located in different parts of the same city or in different cities altogether. Embodiments involving clusters of video cameras 102 may also be considered, where video cameras 102 belonging to one of a number of clusters may be geographically proximate to one another while the clusters themselves may be remote from one another.

Event(s) of interest may be associated with video feed(s) captured by the cameras and stored in one or more databases, such as in the data source(s) 108, as "occurrence records" (also referred to herein as "event occurrence records"). As used herein, the term "occurrence record" refers to information indicative of an event stored or provided by a data source and that may be accessed or obtained from the data source. The data source may be or may comprise a database that stores occurrence records. The occurrence record has an occurrence record type, and may have a time parameter and a geographical parameter. The occurrence record may have other metadata and data associated with additional parameters. The data structure of the occurrence record may depend upon the configuration of the data source and/or database in which the occurrence record is stored. Examples of occurrence records are surveillance video analytics, license plate reads associated with a time and geographical parameter, the identity of a registered criminal with a location of the criminal, 911 call events or computer-aided dispatch (CAD) events with a time parameter, geographical parameter, a narrative and/or a priority value, a gunshot event associated with the picking up of a sound that is identified to be a gunshot having a time parameter, a geographical parameter and perhaps the identification of the firearm, a traffic accident event with a time parameter and a location parameter, etc.

As used herein, the term "time parameter" refers to a parameter specifying time, such as a timestamp, a time interval, or a period of time. Each occurrence record may have one or more time parameters associated therewith.

As used herein, the term "geographical parameter" refers to a location, such as Global Positioning System (GPS) coordinates (e.g., coordinates associated with a location at which the event occurred). The geographical parameter may also be a location range or an area defined by a set of coordinates. The geographical parameter may also be a straight-line distance between a location of a given camera having captured an event and the location at which the event occurred. The geographical parameter may further be a radial distance from the given camera's location to the location at which the event occurred. The distances may be specified in any suitable unit of distance such as meters, kilometers, miles, etc. In addition, the geographical parameter may comprise a direction (e.g., cardinal direction) to the location at which the event occurred. Each occurrence record may have one or more geographical parameters associated therewith.

As used herein, the term "occurrence record type" refers to the nature or type of the occurrence record. For example, the occurrence record type may be one of a surveillance video analytics event, a 911 call or CAD call, the identity of a known criminal, a gunshot event, a license plate read event, etc. Data sources and/or databases storing occurrence records may be associated with an occurrence record type.

As used herein, the term "event type" refers to the nature or type of the event associated with the video feed captured by the camera(s) 102. For example, the event type may comprise, but is not limited to, a gunshot event, a stolen car event, a gas leak event, a glass break event, a door opening event, and the like. The event type may be associated with the occurrence record type such that data sources and/or databases storing occurrence records may also store an event type.

As used herein, the term "query" refers to a request for information from a data source as in 108 and/or database. The query may include, but is not limited to, an occurrence record type or types, an event type or types, one or more time parameters, and one or more geographical parameters. The query may specify additional parameters as a function of the occurrence record type. For instance, when the occurrence record type is a database of convicts, the additional parameters may be convicts that have been charged with third degree murder, or convicted with third degree murder, or that are under the age of 25, that have blond hair, blue eyes, etc. The time parameter may be a defined time, or time range (e.g. in the two years preceding the date of the query). The geographical parameter may be a specific location (e.g. a set of coordinates), or an area (e.g. defined by a plurality of sets of coordinates).

Still referring to FIG. 1, the cameras 102 are communicatively coupled, over a network 104, to a server system 106 which is in turn in communication with one or more data sources 108. The network 104 may comprise any suitable network including, but not limited to, a Personal Area Network (PAN), Local Area Network (LAN), Wireless Local Area Network (WLAN), Metropolitan Area Network (MAN), or Wide Area Network (WAN), or combinations thereof. The server system 106 may store or archive video data from the cameras 102 (e.g., in the memory 114, in one or more of the data sources 108, etc.).

The server system 106 may be a server-based system (as shown in FIG. 1) in communication with one or multiple client devices 110 that may, in some embodiments, also be configured to access the network 104. The server system 106 is illustratively configured to obtain data related to event(s) of interest associated with the video feed(s) captured by the camera(s) 102 and may store the data (e.g., in the data source(s) 108) as one or more occurrence records. As will be discussed further below, the server system 106 is also configured to transmit the data (e.g., video feeds) obtained from the cameras 102, along with any additional relevant information that may be retrieved from the data source(s) 108, to the one or more client devices 110 for presentation on a graphical user interface (GUI). In some cases, the video data (e.g., video feeds) are transmitted directly from the cameras 102 through the network 104 to the one or more client devices 110 for presentation on a GUI. The server system 106 may be internal or "on-site", located in close proximity to the client device 110, for instance in the same building, or may be external or "off-site", located remotely from the client device 110, for instance in a remote data center. The server system 106 may be a cloud-based system.

The server system 106 has at least one processor 112, memory 114, and at least one input/output (I/O) interface 116 for communication with the one or more data sources 108, and/or an I/O interface 118 of the client device 110. The one or more data sources 108 may be one or more external database(s), one or more external systems, for example, having one or more databases, that are accessible via Application Programming Interface (API) calls, and/or one or more local databases that are part of the server system 106.

The processor 112 may be a general-purpose programmable processor. In the example of FIG. 1, the processor 112 is shown as being unitary, but the processor 112 may also be multicore, or distributed (e.g. a multi-processor).

The computer readable memory 114 stores program instructions and data used by the processor 112. The computer readable memory 114 may also store locally occurrence records, acting as a local database. The memory 114 may also store information regarding the data source(s) 108 that are accessible by the server system 106, such as the identity of the data sources 108, the configuration type of the data sources 108, the occurrence record type of the data sources 108, etc. (i.e. the database attribute data structures). The computer readable memory 114, though shown as unitary for simplicity in the example of FIG. 1, may comprise multiple memory modules and/or caching. In particular, the memory 114 may comprise several layers of memory such as a hard drive, external drive (e.g. SD card storage) or the like and a faster and smaller Random Access Memory (RAM) module. The RAM module may store data and/or program code currently being, recently being or soon to be processed by the processor 112 as well as cache data and/or program code from a hard drive. A hard drive may store program code and be accessed to retrieve such code for execution by the processor 112 and may be accessed by the processor 112 to store and access data. The memory 114 may have a recycling architecture for storing, for instance, occurrence records, data source and/or database coordinates, where older data files are deleted when the memory 114 is full or near being full, or after the older data files have been stored in memory 114 for a certain time.

The I/O interface(s) 116 is in communication with the processor 112. The I/O interface(s) 116 may comprise a network interface and may be a wired or wireless interface for establishing a remote connection with, for example, a remote server, an external data source 108, the client device 110, etc. For instance, the I/O interface(s) 116 may be an Ethernet port, a WAN port, a TCP port, etc.

The processor 112, the memory 114 and the I/O interface(s) 116 may be linked via bus connections.

The data source(s) 108 may be one or more remote server(s) comprising one or more databases. A data source 108, and in particular a database, may contain occurrence records, information, corresponding to at least one occurrence record type.

In some examples, the server system 106 may have a local database stored, e.g., in memory 114, that contains occurrence records of at least one occurrence record type.

The client device 110 may be a remote computing device (i.e. client). One or more client devices 110 may be provided, in close proximity to one another, for instance located in the same office or data center, or remote from one another, for instance located in different offices and data centers dispersed across the same city or in different cities altogether.

The client device 110 is in communication with the I/O interface(s) 116 of the server system 106. The computing device 110 has a processor 120, a memory 122, I/O interface(s) 118 that may be linked via bus connections. The computing device 110 may have (or be connect to) any suitable I/O device(s) 124, for example, such as a keyboard, a mouse, a touchscreen, etc. The computing device 110 may be a desktop computer, a laptop, a smartphone, a tablet, etc. The computing device 110 has (or is connect to) a display 126 (e.g. a screen, a tactile display, etc.). The processor 120, the memory 122 and the I/O interface(s) 118 may be similar to the processor 112, the memory 114 and the I/O interface(s) 116, respectively.

A client application program may be stored in memory of the computing device 110 that is associated with the server system 106, the client application program providing the user with an interface to interact with the server system 106.

In some embodiments, the server system 106 may include at least one computing device 110, where, for instance, the connection between the server system 106 and the computing device 110 may be a wired connection. In some embodiments, the functionality of the server system 106 and the client device 110 may be implemented on a single computing device.

The client device 110 may be operated by user(s) to access, view, process, edit and/or analyze information associated with a video feed captured by the cameras 102, the information received via the server system 106. The information may comprise video information, such as the video feed, as well as relevant information obtained from the data source(s) 108. The client device 110 may be configured to launch a video playback application (not shown) that renders a GUI on the display 126. The client device 110 may be configured to launch a web browser or web application (not shown) that renders a GUI on the display 126. The GUI may be used to display outputs and accept inputs and/or commands from user(s) of the client device 110. As will be described further below, the GUI further provides user(s) with the ability to view and/or edit video feeds, as well as be presented information of interest related to the video feeds.

The system 100 may comprise a wide variety of different network technologies and protocols. Communication between the cameras 102, server system 106, data source(s) 108, and client device 110 may occur across wired, wireless, or a combination of wired and wireless networks. The system 100 may include any number of networking devices such as routers, modems, gateways, bridges, hubs, switches, and/or repeaters, among other possibilities, communicatively coupled to the cameras 102, server system 106, data source(1) 108, client device 110 and/or at any point along network 104.

For purposes of illustration, reference is made herein to a system 100 used for security purposes, such as the identification of a crime associated with a known felon, the identification of a stolen vehicle, or the like. However, it should be understood that the system 100 may be used for any other suitable purpose, such as for assisting tourists with the identification of events of interest occurring around the city, or for monitoring public transport or traffic, etc.

Figure 2A:
FIG. 2A illustrates an example graphical user interface on which a user interface element is displayed, in accordance with an illustrative embodiment.

Referring now to FIGS. 2A-2D in addition to FIG. 1, an example embodiment of a GUI 200 for displaying information related to a video feed 202 will now be described. As previously noted, the GUI 200 may be rendered on the display 126 of the client device 110, based on information obtained by the server system 106. In FIG. 2A, a video feed 202 is shown corresponding to video captured by any one of the plurality of video cameras 102, and is displayed in a first region 203 of the GUI 200. Additional information relevant to the video feed 202 may be displayed in the first region 203. For example, a status 210 of the video feed 202 may be shown, indicating whether the video feed 202 is live (i.e. displayed on the GUI 200 in real-time, as the video is being captured by a given camera 102) or pre-recorded, also referred to herein as "previously recorded" (i.e. displayed on the GUI 200 after the video has been captured by the given camera 102). Additional relevant information may be displayed, for example data source information 212 indicative of a source of the video feed 202. The data source information 212 may include a text label, such as "AC Hallway", that indicates the objects, events, places and/or people of interest being monitored by the camera 102.

Figure 2B:
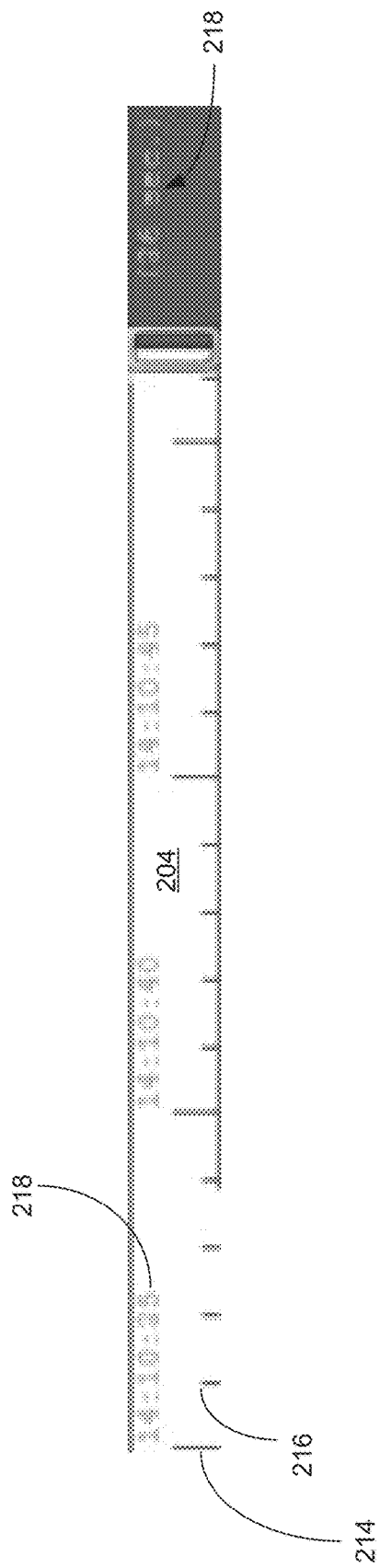
FIG. 2B illustrates an example video timeline, in accordance with an illustrative embodiment.

With continued reference to FIGS. 2A and 2B, a video timeline 204 associated with the video feed 202 may be displayed in a second region 206 of the GUI 200 to indicate a current play time of the video feed 202. In the illustrated embodiment, the second region 206 is positioned below the first region 203. It should however be understood that this is for illustrative purposes only and the positioning of the first and second regions 203, 206 may vary. For navigation purposes, the video timeline 204 may be scaled as illustrated in FIG. 2B. For example, the video timeline 204 may comprise a plurality of repeating major units 214 subdivided into a plurality of repeating minor units 216, the major units 214 representing a first time increment (or interval) and the minor units 216 representing a second time increment (or interval) smaller than the first time increment. For example, the time increment represented by the major units 214 may be a scalar multiple of the time increment represented by the minor units 216. The major units 214 may represent, for example, a time interval of five (5) seconds, while the minor units 216 may represent a time interval of one (1) second. The major units 214 may be graphically distinct from the minor units 216, for example, by being represented using a longer and/or bolder vertical line on the video timeline 204, while the minor units 216 may be represented using a shorter and/or narrower vertical line on the video timeline 204. A total duration 218 of the video feed 202 may be displayed on the video timeline 204, using a text label specifying at least the unit of time (hours, seconds, minutes, etc.), such as "(36 sec.)".

Figure 2C:
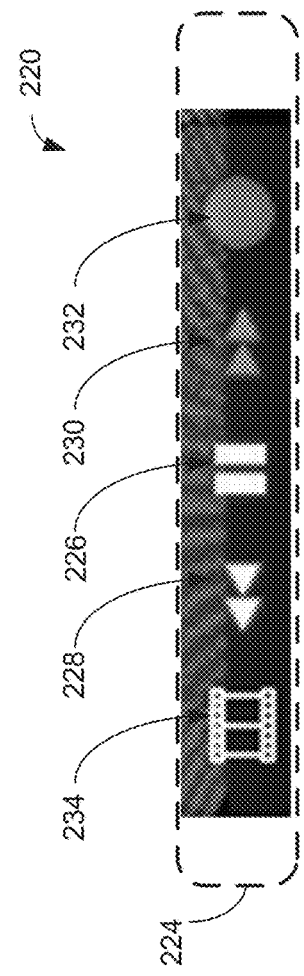
FIG. 2C illustrates an example video feed control panel, in accordance with an illustrative embodiment.

With continued reference to FIGS. 2A and 2C in addition to FIG. 1, a video feed control panel 220 may be provided at any suitable location on the GUI 200, for instance overlaid on top of video feed 202. The control panel 220 may allow a user to perform control functions associated with the video feed 202. This may be achieved by the user interacting with (e.g., depressing or selecting, using a suitable input device such as a mouse or the like) at least some of the control icons 224 provided on the video feed control panel 220. The control icons 224 include, for example, but are not limited to, a pause/play icon 226 for pausing or playing the video feed 202, a fast-forward icon 230 for fast-forwarding the video feed 202, a rewind icon 228 for rewinding the video feed 202, a recording icon 232 for recording the video feed 202, and/or a save video feed icon 234 for saving the video feed 202 (e.g., for later viewing or editing). At least some of the control icons 224 may in some instances be unavailable for interaction, depending on the type or status (indicated at 210) of the video feed 202 (e.g. live or pre-recorded).

Figure 2D:
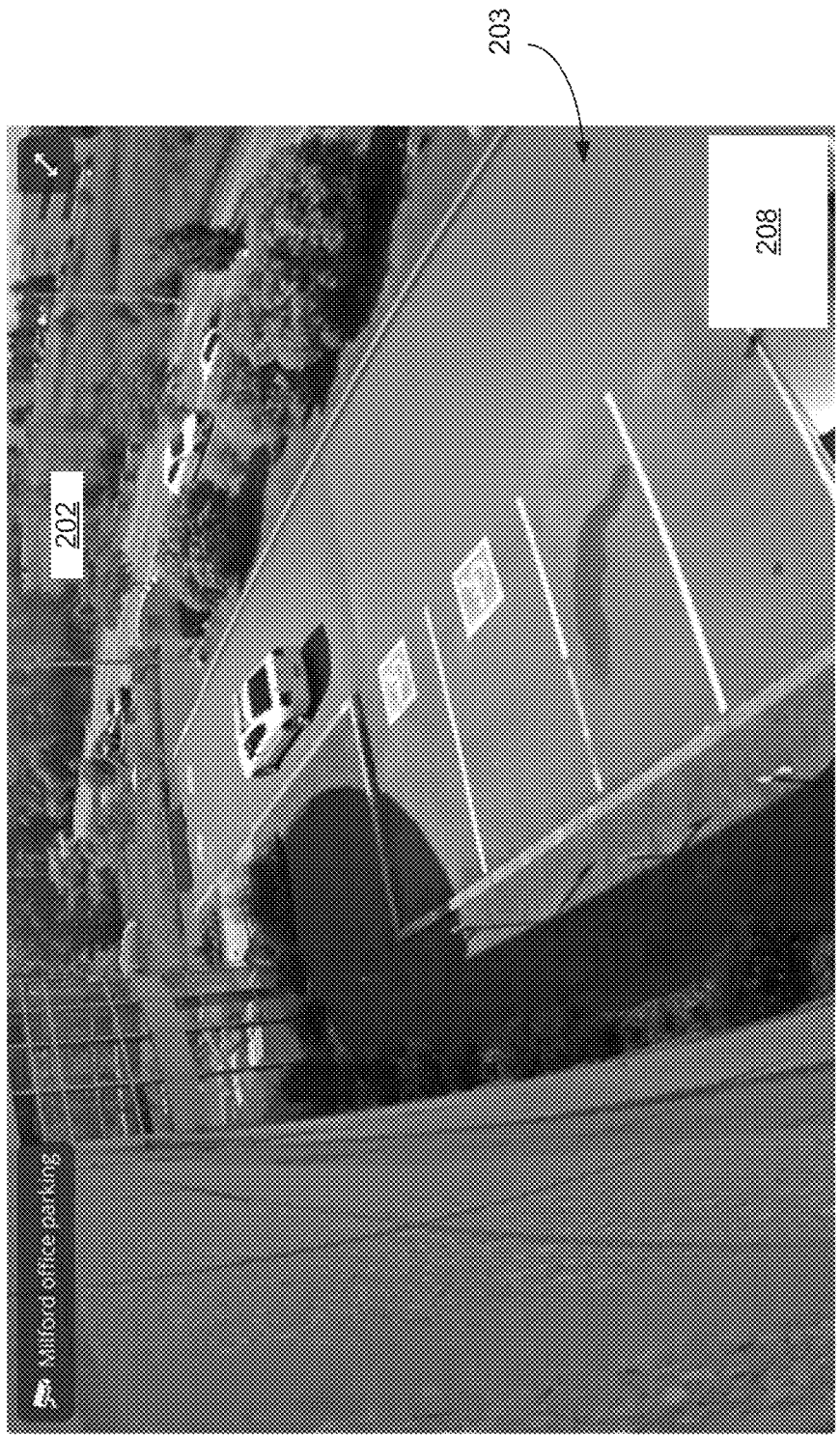
FIG. 2D illustrates an example graphical user interface on which a user interface element is displayed, in accordance with another illustrative embodiment.

In addition, in some embodiments (see, for example, FIG. 2D), the GUI 200 may be rendered with only the video feed 202 being displayed in the first region 203, i.e. with no video timeline 204 and no video feed control panel 220 being displayed (e.g., in a second region 206). As shown in FIG. 2D, the user interface element 208 may be displayed in the first region 203 that the video feed 202 is displayed in, when only the video feed 202 is being displayed in the first region 203, i.e. with no video timeline 204 and no video feed control panel 220 being displayed (e.g., in a second region 206). In some embodiments, when the user interface element 208 is displayed in the first region 203, the video timeline 204 and/or the video feed control panel 220 may then be displayed whereas the video timeline 204 and/or the video feed control panel 220 were previously not displayed. In some embodiments, the user interface element 208 may be displayed in any other suitable part of the GUI 200 (e.g., in an event or alert notification area separate from or at least in part separate from the first and second regions 203, 206).

With continued reference to FIG. 2A, at least one user interface element 208 indicative of occurrence at least one event associated with the video feed 202 may be superimposed on the video timeline 204 and/or the displayed video feed 202. Each user interface element 208 provides users with an overview of the nature of the event(s) associated with video feed(s) captured by the camera(s) 102 and serves to inform further response actions. In one embodiment, the at least one user interface element 208 may be displayed for both active (i.e. unresolved) and closed (i.e. resolved) events. In other embodiments, only active events may be considered and corresponding user interface element(s) as in 208 displayed on the GUI 200 accordingly.

The at least one user interface element 208 is illustratively positioned on the video timeline 204 at a position corresponding to a time of occurrence of the at least one event. In some embodiments, the user interface element 208 may be superimposed on both the video feed 202 and the video timeline 204, so as to span both the first and the second regions 203, 206 of the GUI 200 (as illustrated in FIG. 2A). In some embodiments, multiple user interface elements 208 indicative of the occurrence of multiple events of interest may be superimposed on the video timeline 204, as will be described further below. In some embodiments, the at least one user interface element 208 is indicative of occurrence of one or more events within a pre-determined range (e.g., radius or distance) of the location of at least one camera 102 having captured the video feed(s) the at least one event is associated with.

Figure 3A:
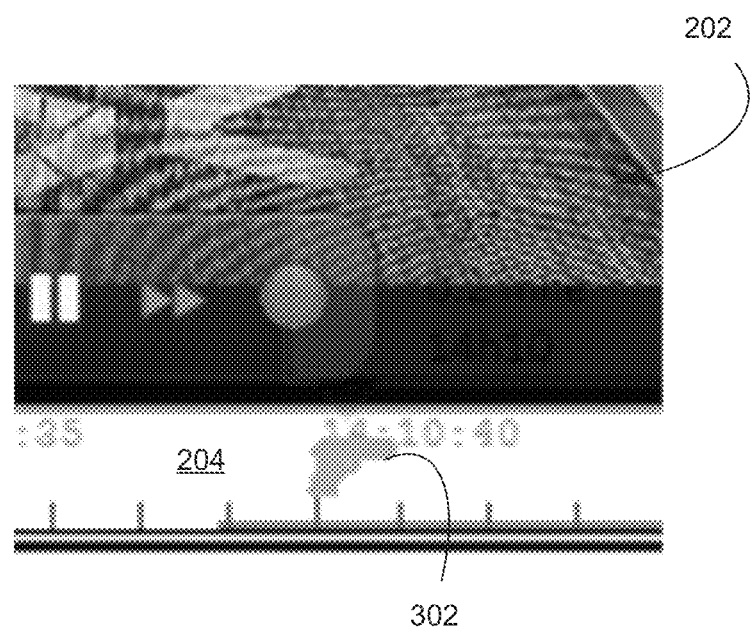
FIG. 3A illustrates an example graphical user interface comprising an icon superimposed on a video timeline, in accordance with an illustrative embodiment.

Referring now to FIG. 3A in addition to FIG. 2A, a first embodiment of the user interface element 208 will now be described. In the embodiment of FIG. 3A, the user interface element 208 comprises an icon 302 that is displayed automatically in the second region 206 of the GUI 200, based on the event associated with the video feed 202. More specifically, the icon 302 is superimposed on the video timeline 204 at a position corresponding the time of occurrence of the corresponding event. The icon 302 provides a graphical representation of the event, which may allow users to have a clear indication as to the nature of the event. The icon 302 to be displayed may be selected by a user, such as one or more administrators of the system 100, via their client device 110, or automatically selected by the server system 106 in FIG. 1, based on the occurrence record associated with the event. In one embodiment, the server system 106 may be configured to query the memory 114 and/or data source(s) 108 in order to retrieve a set of event types, for example, upon receipt of a video feed from a given camera 102. The server system 106 may then be configured to identify, based on the plurality of event types as retrieved, an event type associated with the current event. The server system 106 may then select the icon 302 based on the event type as identified. A received occurrence record may comprise an event type, and the icon 302 may be selected according to the event type of the occurrence record.

Figure 3B:
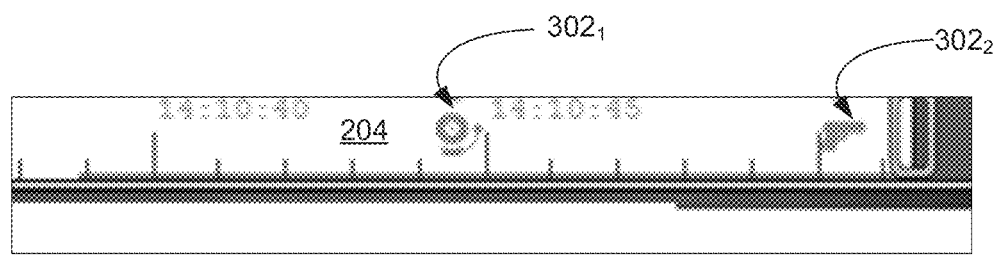
FIG. 3B illustrates an example video timeline having two different icons superimposed thereon, in accordance with an illustrative embodiment.

In the embodiment of FIG. 3A, the event is a gunshot event such that the icon 302 is a firearm that provides a graphical representation of the gunshot event. It should however be understood that different icons as in 302 may apply, depending on the event type. For example, FIG. 3B illustrates a first icon $302_1$ indicative of a first event having a first event type, and a second icon $302_2$ indicative of a second event different from the first event and having a second event type. The icons $302_1$, $302_2$ are superimposed on the video timeline 204 in the second region 206 of the GUI 200, with the first icon $302_1$ being different from the second icon $302_2$. The first icon $302_1$ is an alarm icon that provides a graphical representation of an alarm event (e.g., a glass break event, etc.) while the second icon $302_2$ is a firearm that provides a graphical representation of a gunshot event. While two icons $302_1$, $302_2$ are illustrated in FIG. 3B, it should be understood that any suitable number of icons 302 may be displayed, depending on the number of events associated with the video feed 202 captured by the cameras 102. In addition, the icons 302 may comprise any suitable symbol or representation, and may have any suitable shape and size, depending on the event(s) associated with the video feed(s) captured. Other embodiments than the ones illustrated and described herein may therefore apply.

Figure 4A:
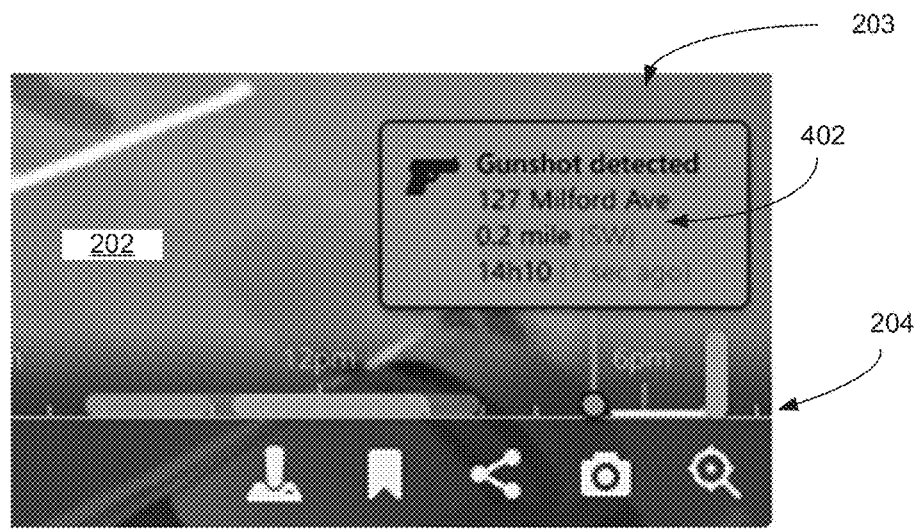
FIG. 4A illustrates an example graphical user interface comprising a pop-up element, in accordance with an illustrative embodiment.
Figure 4B:
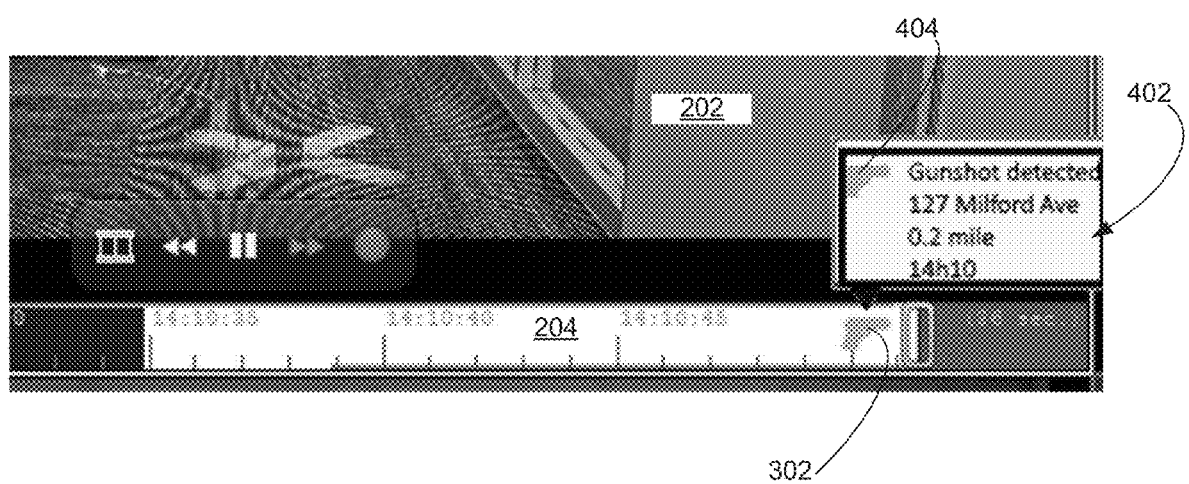
FIG. 4B illustrates an example graphical user interface comprising an icon and a pop-up element, in accordance with an illustrative embodiment.
Figure 4C:
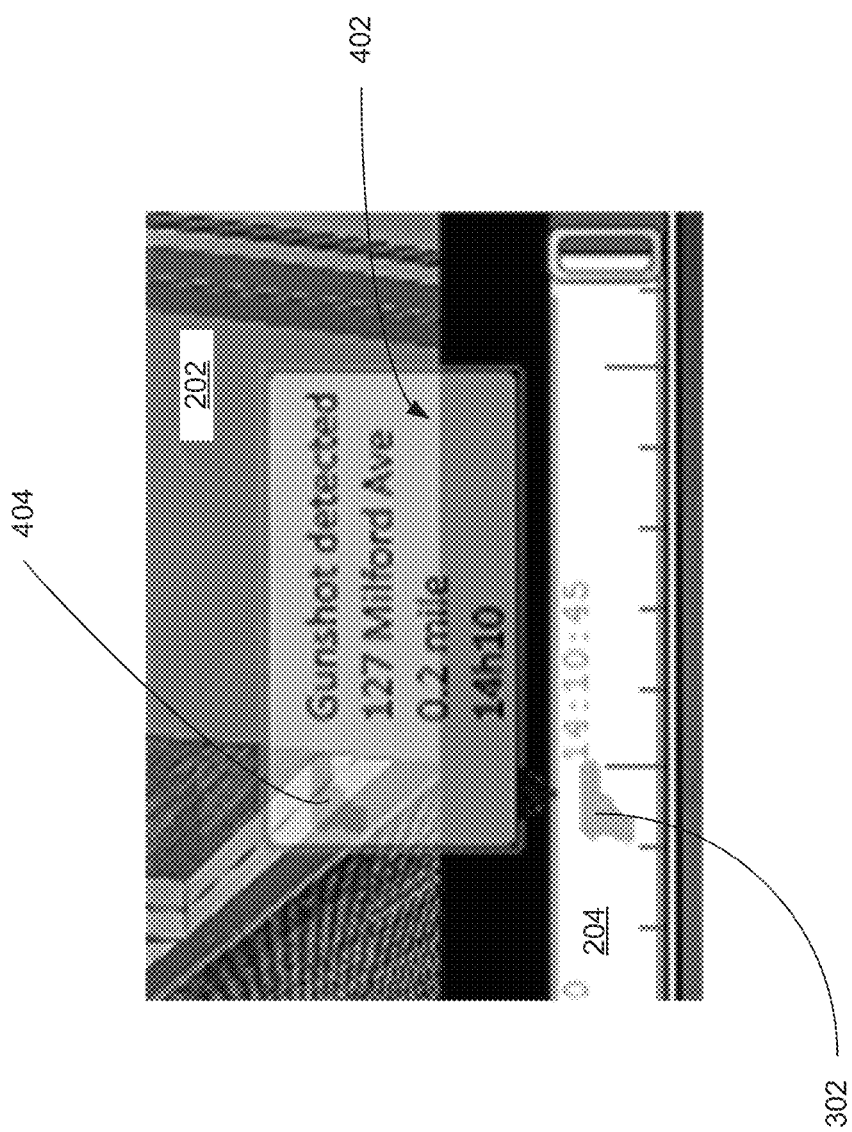
FIG. 4C illustrates the example graphical user interface of FIG. 4B with a fading pop-up element, in accordance with an illustrative embodiment.

Referring now to FIGS. 4A, 4B, and 4C, in one embodiment, the user interface element 208 may comprise at least one pop-up element 402 that is displayed automatically, based on the event associated with the video feed 202. In one embodiment, the pop-up element 402 is a text box element having a substantially rectangular shape. It should however be understood that the pop-up element 402 is not limited to a text box element and may have any suitable shape and size. The pop-up element 402 is displayed at least in part in the first region 203 of GUI 200 and is at least partly superimposed on the displayed video feed 202. Although the pop-up element 402 is illustrated in FIG. 4A as being displayed in the first region 203 of the GUI 200 only, it should be understood that the pop-up element 402 may span both the first and the second regions 203, 206. In some embodiments, the user interface element 208 may only comprise the pop-up element 402 such that only the pop-up element 402 is displayed in the GUI 200, i.e. with no icon 302 being displayed in the GUI 200. As illustrated in FIG. 4A, no icon 302 is shown in the video timeline 204. In some embodiments, the user interface element 208 comprises an event indicator (e.g., such as a circle or other suitable shaped indicator) that is displayed in the video timeline 204 (as illustrated in FIG. 4A). As shown in FIG. 4A, the event indicator is a non-icon-based indicator that does not convey the type of the event. In other embodiments, the user interface element 208 may comprise both the icon 302 and the pop-up element 402, with the pop-up element 402 being positioned adjacent to the icon 302 (see, for example, FIG. 4B).

The pop-up element 402 may be displayed for a pre-determined duration (e.g. between five (5) and fifteen (15) seconds, or any other suitable duration) and may have a transparency setting that varies over the pre-determined duration (as illustrated in FIG. 4C). The transparency setting may be set at a minimum transparency (e.g. the pop-up element 402 may be opaque) when the pop-up element 402 is initially displayed (as shown in FIG. 4B) and the transparency setting may gradually decrease to a maximum transparency setting in order to gradually conceal the pop-up element 402 form the GUI 200. In other words, the pop-up element 402 may gradually fade over time. The maximum and minimum transparency settings may be pre-determined and stored in the memory 114 associated with the server system 106. In embodiments where the pop-up element 402 is displayed adjacent to the icon 302, the icon 302 may remain apparent on the video timeline 204 (similar to what is shown in FIG. 3A) after the pre-determined duration has elapsed and the pop-up element 402 has been concealed. In embodiments where multiple pop-up elements as in 402 are displayed simultaneously in the first region 203 of the GUI 200, each pop-up element 402 may be displayed for a pre-determined time duration and have its own transparency setting. In some embodiments, user interaction with the pop-up element 402, for example by hovering a mouse cursor over the pop-up element 402, by clicking on the pop-up element 402 using a mouse, or by tapping the pop-up element 402 on a touchscreen, may reset the transparency setting of the pop-up element 402 (e.g., from the current transparency to the minimum transparency). In this manner, the pop-up element 402 may re-appear on the GUI 200.

The manner in which the pop-up element 402 is displayed on the GUI 200 may depend on the type (or status) of the video feed 202. In one embodiment, the video feed 202 is a live video feed and the pop-up element 402 is displayed in response to the server system 106 detecting occurrence of an event associated with a video feed captured by a camera 102. The server system 106 may indeed be configured to detect such occurrence in real-time, based on one or more event occurrence records obtained from the data source(s) 108. In some embodiments where the video feed 202 is a live video feed, the pop-up element 402 is displayed in response to the server system 106 detecting, in real-time, occurrence of an event within a pre-determined range (e.g. a pre-determined radius or distance) of the camera's location. This may be achieved based on the event occurrence record(s), and more particularly on the geographical parameter(s) associated with the occurrence record(s). The server system 106 may be configured to have the pre-determined range assigned to the camera providing the video feed 202. Each camera 102 providing a video feed may have a corresponding pre-determined range associated therewith, which may be the same between the cameras 102 or may vary between the cameras 102. A user may provide input to set the pre-determined range. In some embodiments, as occurrence records are received from the one or more data sources 108, the geographical parameter of the occurrence records are compared to the pre-determined ranges of the one or more cameras 102 having a respective video feed displayed in the GUI 200. In some embodiments, when the geographical parameter of a given occurrence record (e.g., the location of the event associated with the given occurrence record) is detected as occurring in the pre-determined range of one of the one or more cameras 102 having a respective video feed displayed in the GUI 200, this triggers the display of the user interface element 208.

In some other embodiments, the video feed 202 is previously recorded (rather than being a live feed received from the camera(s) 102 in real-time) and the GUI 200 is used to replay the recorded video feed 202, which may be retrieved by the server system 106 from memory 114 and/or the data source(s) 108. One or more events may be associated with the video timeline 204. In this case, the video timeline 204 is indicative of a playback time of the recorded video feed 202. A pop-up element 402 associated with a given event (associated with the recorded video feed) is then automatically displayed in the GUI 200 in response to the server system 106 detecting that the time of occurrence of the given event is within a pre-determined timeframe (i.e. is approaching) the current playback time of the recorded video feed. Any suitable timeframe may apply. In one embodiment, a timeframe of several (e.g., five (5)) seconds may be used. For example, if the given event occurred at 5 PM (as illustrated in FIG. 4A), the corresponding pop-up element 402 may be displayed when the current playback time is five (5) seconds away from 5 PM.

Still referring to FIGS. 4A, 4B, and 4C, the pop-up element 402 provides first information of interest about the event. The first information of interest may be obtained from the occurrence record associated with the event, and may be based on the time parameter, geographical parameter, occurrence record type, and/or any other suitable parameter associated with the occurrence record. In one embodiment, the first information of interest comprises, but is not limited to, a title associated with the event, a timestamp indicative of the time of occurrence of the event, and/or a description of the event. The timestamp may be displayed in 12 or 24 hour format, depending on user preference. The timestamp may further contain an indication of the time elapsed (e.g., "6 seconds ago") since the occurrence of the event, which may be rendered in a different font and/or color from the time of occurrence of the event. The first information of interest may further comprise an icon 404 providing a graphical representation of the event. The icon 404 may be the same, or similar to, the icon 302 and may prove useful as a visual aid, particularly when, for example, multiple pop-up elements as in 402 are displayed simultaneously in the first region 203 of GUI 200. The icon 404 may be an additional icon in embodiments where the icon 302 is shown in the video timeline 204. In addition, the first information of interest may comprise a straight-line distance between the camera's location and the location at which the event occurred, a radial distance from the camera's location to the event's location, directions to (e.g., an address associated with) the location of the event, and/or geographical (e.g., GPS) coordinates associated with the event's location. In the embodiment of FIGS. 4A, 4B, and 4C, the first information of interest comprises a description of the event ("Gunshot detected"), an address ("127 Milford Ave") indicative of the location of the event, a distance (0.2 mile) to the location of the event, and a timestamp ("14 h10") indicative of the time of occurrence of the event. Other embodiments may apply.

Figure 5A:
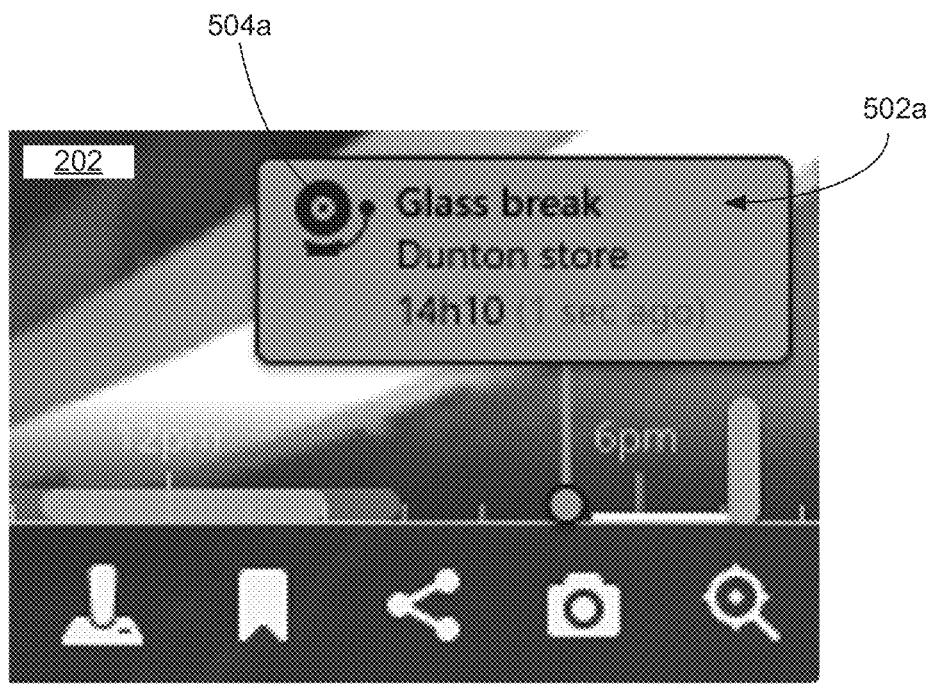
FIG. 5A illustrates an example graphical user interface comprising a pop-up element indicative of a glass break event, in accordance with an illustrative embodiment.
Figure 5B:
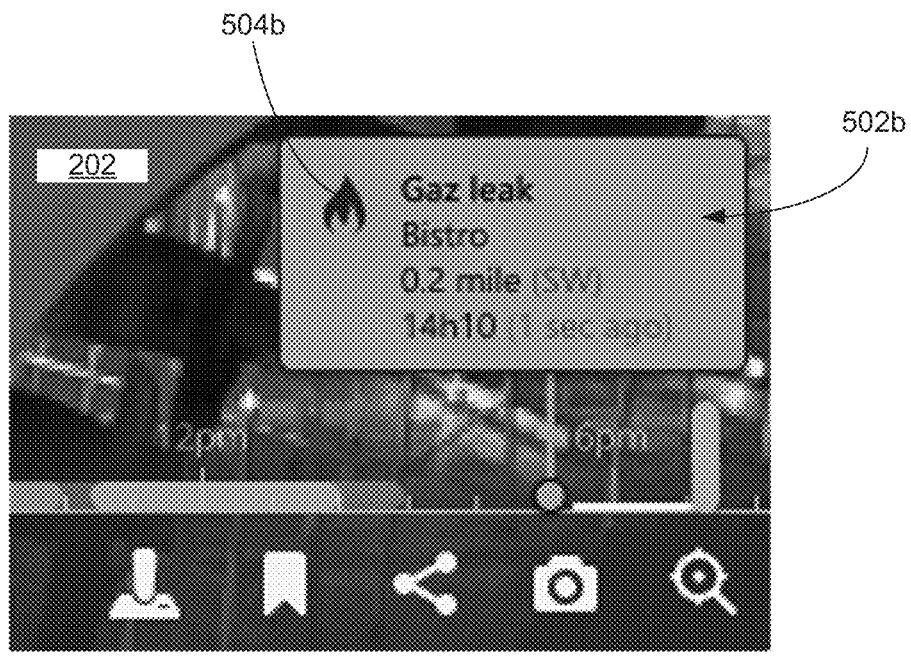
FIG. 5B illustrates an example graphical user interface comprising a pop-up element indicative of a gaz leak event, in accordance with an illustrative embodiment.
Figure 5C:
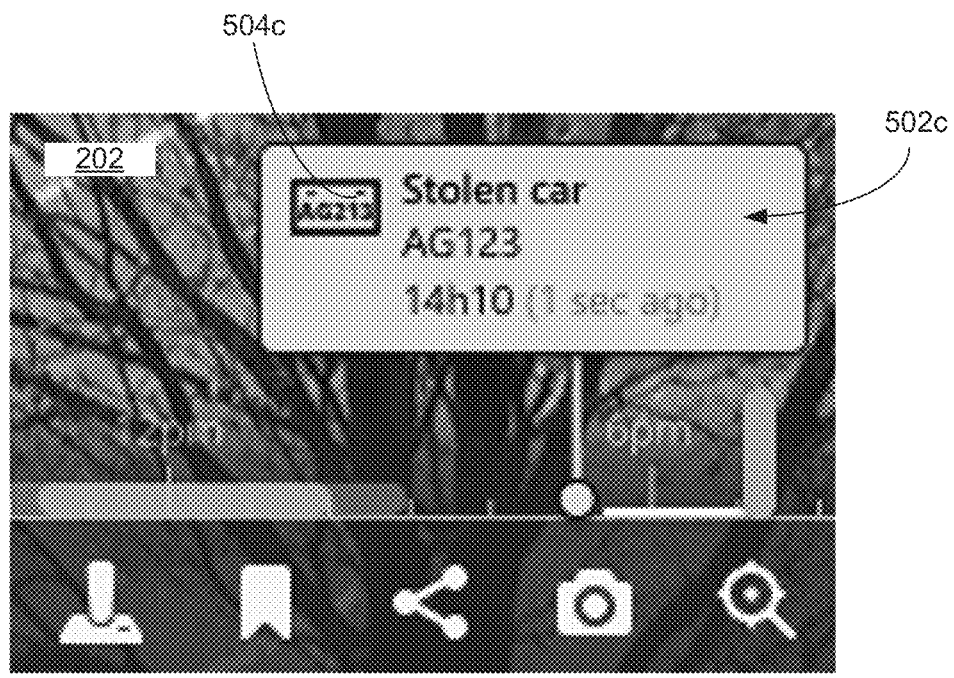
FIG. 5C illustrates an example graphical user interface comprising a pop-up element indicative of a stolen car event, in accordance with an illustrative embodiment.
Figure 5D:
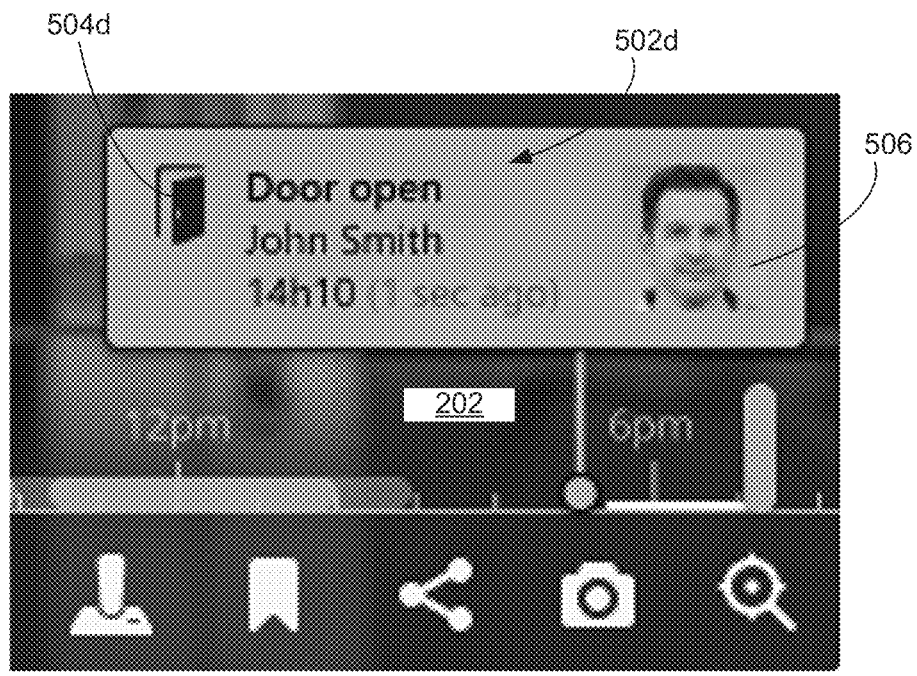
FIG. 5D illustrates an example graphical user interface comprising a pop-up element indicative of a door opening event, in accordance with an illustrative embodiment.

Referring now to FIGS. 5A, 5B, 5C, and 5D in addition to FIG. 4A, different pop-up elements 402 may be used to provide different information of interest, for example, depending on the event type determined by the server system 106 based on the event occurrence record(s). In the embodiment of FIG. 5A, the event associated with the video feed 202 is a glass break event and a pop-up element 502a displays information of interest about the event, including its corresponding icon 504a (matching the icon 302, if any), description or title ("Glass break"), location ("Dunton store"), and timestamp ("14 h10 (1 sec ago)") indicative of the time of occurrence of the event. In the embodiment of FIG. 5B, the event associated with the video feed 202 is a gaz leak event and a pop-up element 502b displays information of interest about the event, including its corresponding icon 504b, description or title ("Gaz leak"), location ("Bistro"), approximate distance and direction ("0.2 mile (SW)"), and timestamp ("14 h10 (1 sec ago)"). In the embodiment of FIG. 5C, the event associated with the video feed 202 is a stolen car event and a pop-up element 502c displays information of interest about the event, including its corresponding icon 504c, description or title ("Stolen car"), license plate number ("AG123"), and timestamp ("14 h10 (1 sec ago)"). In the embodiment of FIG. 5D, the event associated with the video feed 202 is an access control event, and in particular a door opening event, and the pop-up element 502d displays information of interest about the event, including its corresponding icon 504d, description or title ("Door open"), name of the person(s) who opened the door ("John Smith"), image 506 of the person(s) who opened the door, and timestamp ("14 h10 (1 sec ago)"). Other embodiments may apply.

Figure 6A:
FIG. 6A illustrates an example graphical user interface comprising two different pop-up elements indicative of two different events, in accordance with an illustrative embodiment.
Figure 6B:
FIG. 6B illustrates an example graphical user interface comprising two different icons and two different pop-up elements indicative of two different events, in accordance with an illustrative embodiment.

FIGS. 6A and 6B show further embodiments where different icons 302 and/or pop-up elements 402 are displayed to represent and/or provide information about different events of different event types. In the embodiment of FIG. 6A, a first pop-up element 602a associated with a gunshot event is first automatically displayed on the GUI 200 upon occurrence (on Tuesday the 14$^{th}$ at 2 AM) of the gunshot event. The first pop-up element 602a is superimposed on the video timeline 204 at a position 604a corresponding to the time of occurrence (i.e. 2 AM) of the gunshot event. When a glass break event subsequently occurs (on Tuesday the 14$^{th}$ at 5 PM), a second pop-up element 602b associated with the glass break event is then automatically displayed on the GUI 200. The second pop-up element 602b, which is different from the first pop-up element 602a, is superimposed on the video timeline 204 at a position 604b corresponding to the time of occurrence (i.e. 5 PM) of the glass break event. In the embodiment of FIG. 6A, the first pop-up element 602a comprises a first icon 606a (i.e. a firearm) providing a graphical representation of the gunshot event, while the second pop-up element 602b comprises a second icon 606b (i.e. an alarm icon) providing a graphical representation of an alarm event, which in this case is the glass break event, the first and the second icons 606a, 606b being different. FIG. 6A further illustrates that the first pop-up element 602a has started to fade with time, since its transparency setting is higher (i.e. it is more transparent) than the transparency setting of the second pop-up element 602b.

Unlike the embodiment of FIG. 6A where only the pop-up elements 602a and 602b (respectively comprising different icons 606a and 6060b) are displayed in the GUI 200, in the embodiment of FIG. 6B, in addition to the first pop-up element 602a and the second pop-up element 602b, icons 302a and 302b are displayed (i.e. superimposed) on the video timeline 204, in the manner described above with reference to FIG. 3A. Similarly to icon 606a, the icon 302a is an alarm icon that provides a graphical representation of an alarm event, which in this case is the glass break event. The icon 302a is superimposed on the video timeline 204, adjacent to the first pop-up element 602a and at a position corresponding to the time of occurrence of the glass break event. Similarly to icon 606b, the icon 302b is a firearm icon that provides a graphical representation of the gunshot event. The icon 302b is superimposed on the video timeline 204, adjacent to the second pop-up element 602b and at a position corresponding to the time of occurrence of the gunshot event.

Figure 7:
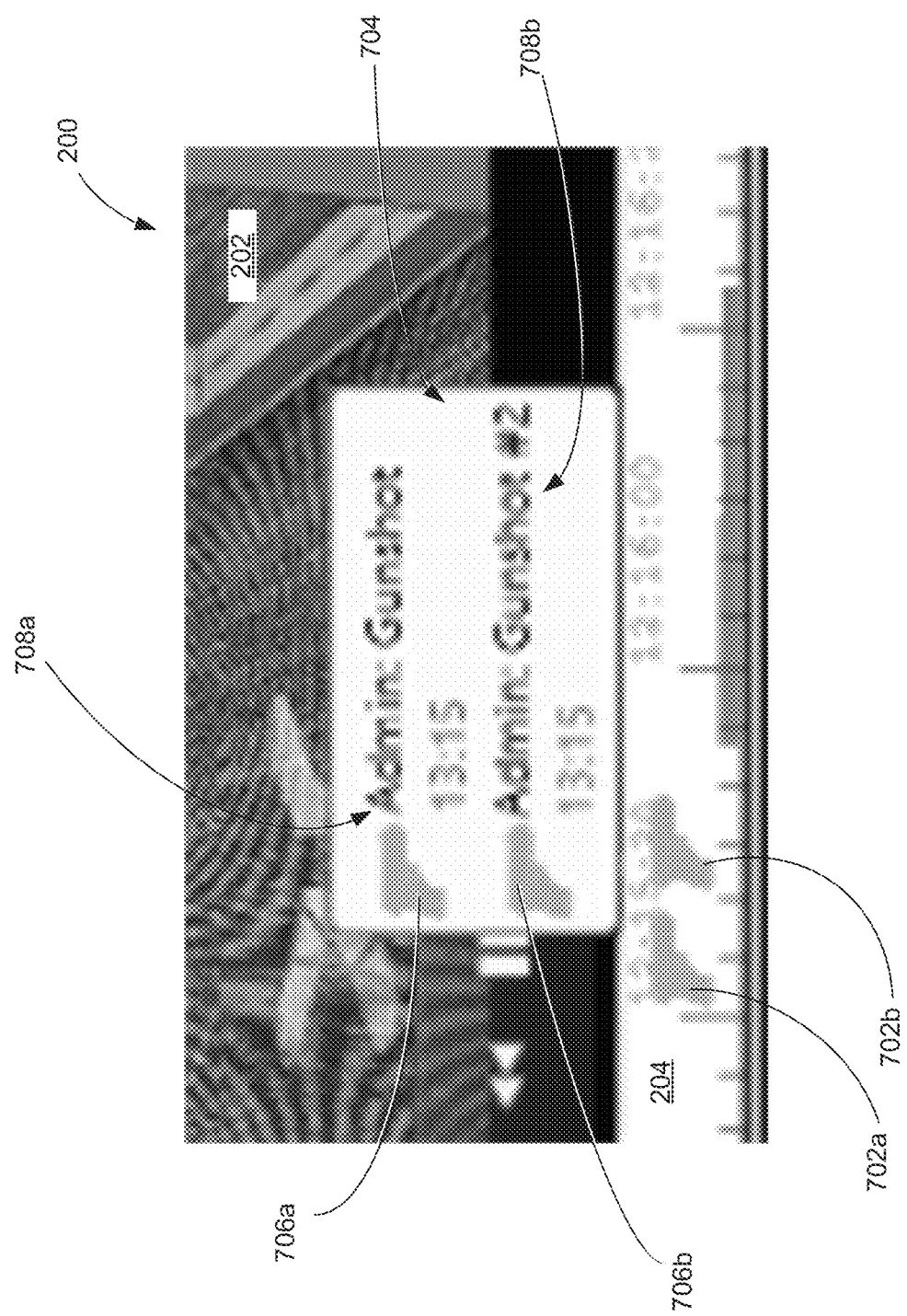
FIG. 7 illustrates an example graphical user interface comprising a consolidated pop-up element, in accordance with an illustrative embodiment.

Referring now to FIG. 7, in some embodiments, consecutive events may be represented by superimposing a plurality of icons 702a, 702b on the video timeline 204 of GUI 200 at positions corresponding to times of occurrence of the consecutive events. In such cases, a consolidated pop-up element 704 may be displayed adjacent one or more of the icons 702a, 702b and at least partly superimposed on the video feed 202. The consolidated pop-up element 704 displays first information of interest about each of the plurality of consecutive events. In one embodiment, the first information of interest is displayed in a vertically stacked manner within the same pop-up element 704. The consolidated pop-up element 704 may, for example, display the first information of interest about the consecutive events as an ordered list, in descending or ascending order of occurrence of the events. Other embodiments may apply.

As previously noted, the first information of interest may comprise an icon (providing a graphical representation of the event) and/or additional information (e.g., obtained from the occurrence record(s) retrieved from the data source(s) 108). For example, in the embodiment of FIG. 7, consecutive gunshot events have occurred and the consolidated pop-up element 704 comprises a first firearm icon 706a and first information 708a including a title of the first gunshot event ("Admin: Gunshot") and a timestamp ("13:15") associated with the first gunshot event represented on the video timeline 204 by firearm icon 702a. The consolidated pop-up element 704 further comprises a second firearm icon 706b and second information 708b including a title of the second gunshot event ("Admin: Gunshot #2") and a timestamp ("13:15") associated with the second event represented on the video timeline 204 by icon 702b. It can be seen from FIG. 7 that all four icons 702a, 702b, 706a, and 706b are the same since they provide a graphical representation of a gunshot event. Still, other possibilities may also apply.

Figure 8A:
FIG. 8A illustrates an example graphical user interface comprising a side pane, in accordance with an illustrative embodiment.
Figure 8B:
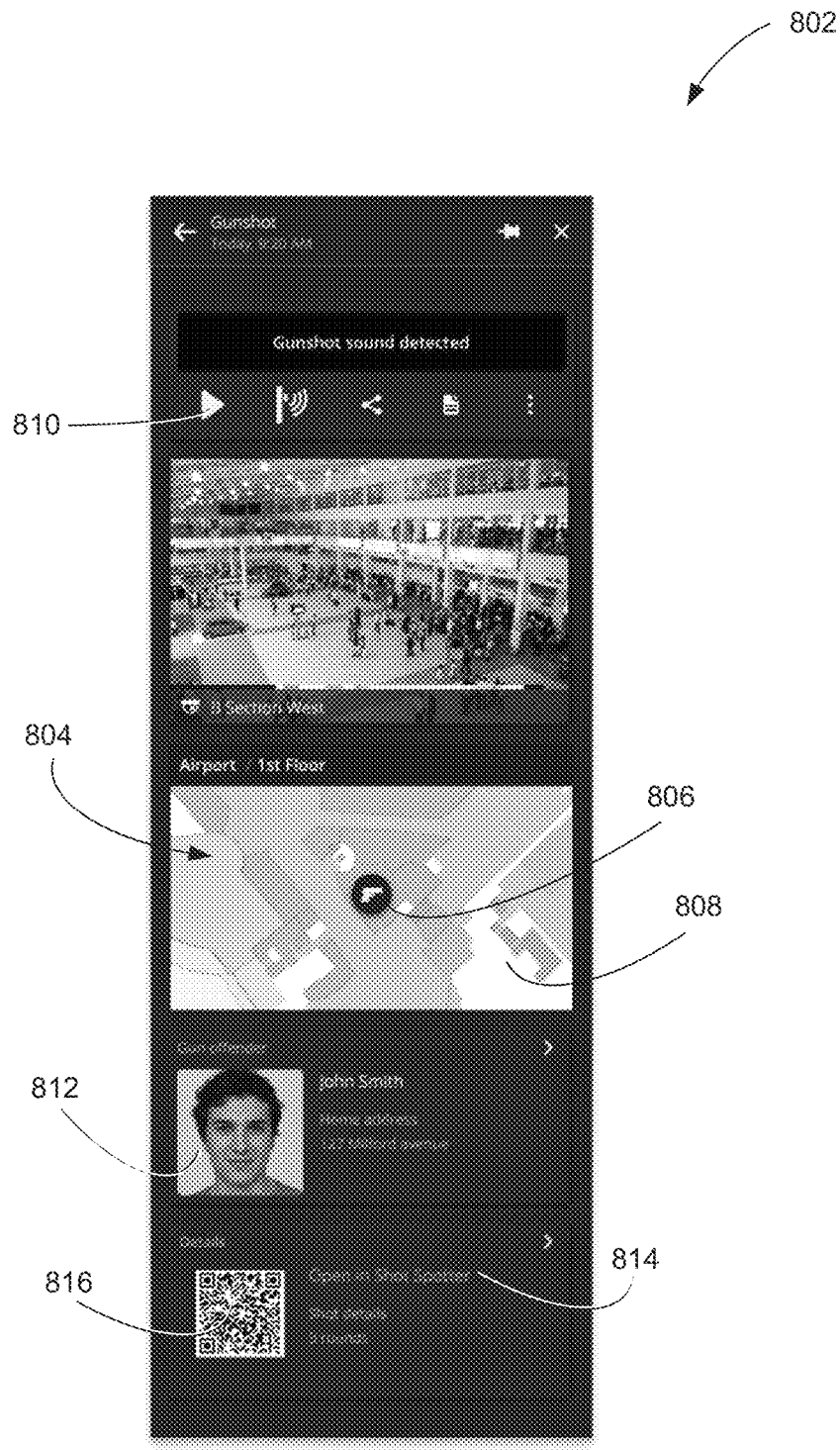
FIG. 8B is a detailed view of the side pane of FIG. 8A, in accordance with an illustrative embodiment.

Referring now to FIGS. 8A and 8B in addition to FIG. 1, in some embodiments, user interaction (e.g., using a mouse, touchscreen, keyboard, or other suitable user input device associated with the client device 110) with a given pop-up element 402 displayed (optionally adjacent to the icon 302) in the first region 203 of GUI 200 may cause second information of interest to be displayed on the GUI 200, for instance in a third region (e.g., a side pane) 802 of GUI 200. The second information of interest may provide additional details relevant to the event(s) associated with the video feed 202 and may be obtained based on the occurrence record(s) corresponding to the event, as retrieved for instance by the server system 106 upon query of the data source(s) 108. In some embodiments, the second information of interest may be provided in the third region 802 of the GUI 200 because it may not be appropriate to display, for example, in the limited space provided by the pop-up element 402. It should however be understood that the second information of interest may be provided outside of the GUI 200 and the user may, for example, be directed to a new page displaying the second information of interest. The second information of interest, in combination with the first information of interest provided by the pop-up element 402, may allow users to gain a more comprehensive understanding of event(s) and to take appropriate actions in response.

With continued reference to FIG. 8B, the second information of interest displayed (e.g., in the third region 802 of the GUI 200) may comprise, but is not limited to, an image associated with the event, audio data associated with the event, a hyperlink pointing to an external source of information relevant to the event, a matrix barcode encoding a link pointing to the external source of information, a matrix barcode encoding an identifier pointing to the external source of information, and/or location information associated with the at least one event. In the embodiment of FIG. 8B, the second information of interest comprises location information 804 associated with the event. The location information 804 is represented as a location icon 806 (indicative, for instance, of GPS coordinates associated with the event's location) displayed on a map 808 of the area monitored by the camera(s) 102. In some embodiments, the location icon 806 may provide a graphical representation of the event, as is the case of the embodiment of FIG. 8B for example, in which a firearm is used as the location icon 806.

In the embodiment of FIG. 8B, the second information of interest further comprises audio data represented by an icon 810 that the user may interact with (e.g., click on) to be provided access to the audio data (e.g., to play an audio file). The second information of interest further comprises an image 812, which may identify a person of interest associated with the event. A hyperlink 814 to an external source of information (e.g., a website or the like) relevant to the event is also provided and the user may access the external source of information by clicking the hyperlink 814. In the illustrated embodiment, the second information of interest further comprises a matrix barcode 816, which may encode a link pointing to the external source of information or an identifier pointing to the external source of information, among other possibilities. In addition, a license plate image (not shown) may also displayed, which may be particularly relevant for a stolen car event. It should be understood that, depending on the type of event, other information of interest may also be provided (e.g., in the third region 802 of the GUI 200).

Figure 9:
FIG. 9 illustrates an example graphical user interface displaying multiple video feeds, in accordance with an illustrative embodiment.

Referring now to FIG. 9 in addition to FIG. 1, in some embodiments, the GUI 200 may display information related to a plurality of video feeds 902, for instance video feeds 902a, 902b, 902c, and 902d, each one of the plurality of video feeds 902 corresponding to video captured by a given one of the plurality of video cameras 102. The plurality of video feeds 902 may be arranged on the GUI 200 in any suitable manner. In the illustrated embodiment, the video feeds 902a, 902b, 902c, and 902d are arranged in a grid pattern on the GUI 200. Common arrangements of the plurality of video feeds 902 may include, for instance, 2×2, 4×4, and 8×8 grid patterns. Other grid patterns may also be considered, for instance 2×1, 3×2, and so on. Each of the plurality of video feeds 802 may have an associated video timeline, which may be visible (see, for example, video feeds 902a, 902b, and 902c having video timelines 904a, 904b, and 904c associated therewith) or not (see, for example, video feed 902d) depending, for instance, on the status (e.g., live or recorded) of the video feeds 802. Users may investigate and/or monitor the plurality of video feeds 902 simultaneously on GUI 200, where a relevant icon 302 and/or pop-up element 402 may appear on the video feed 902a, 902b, 902c, 902d and/or the video timeline 904a, 904b, 904c to indicate the occurrence of an event.

In some embodiments, occurrence records may be received from one or more data sources 108. The received occurrence records are each indicative of an event. Each of the received occurrence records comprises a geographical parameter indicative of a location of the event associated with the occurrence record. In this example, the cameras 102 provide their video feeds and a first set of one or more camera video feeds is displayed in the GUI 200 and a second set of one or more camera video feeds is not displayed in the GUI 200. The cameras 102 providing video feeds may each have a corresponding pre-determined range associated therewith. The geographical parameter of each occurrence record is compared to the pre-determined ranges of the cameras 102, including comparing it to the cameras of the second set of camera video feeds that are not displayed in the GUI 200. In some embodiments, when the geographical parameter of a given occurrence record (e.g., the location of the event associated with the given occurrence record) is detected as occurring in the pre-determined range of one of the cameras 102 in the second set (i.e., not having a video feed displayed in the GUI 200), this triggers the display of the video feed of the camera with the event occurring within the pre-determined range of that camera in the GUI 200 and may also trigger the display of the user interface element 208.

Figure 10:
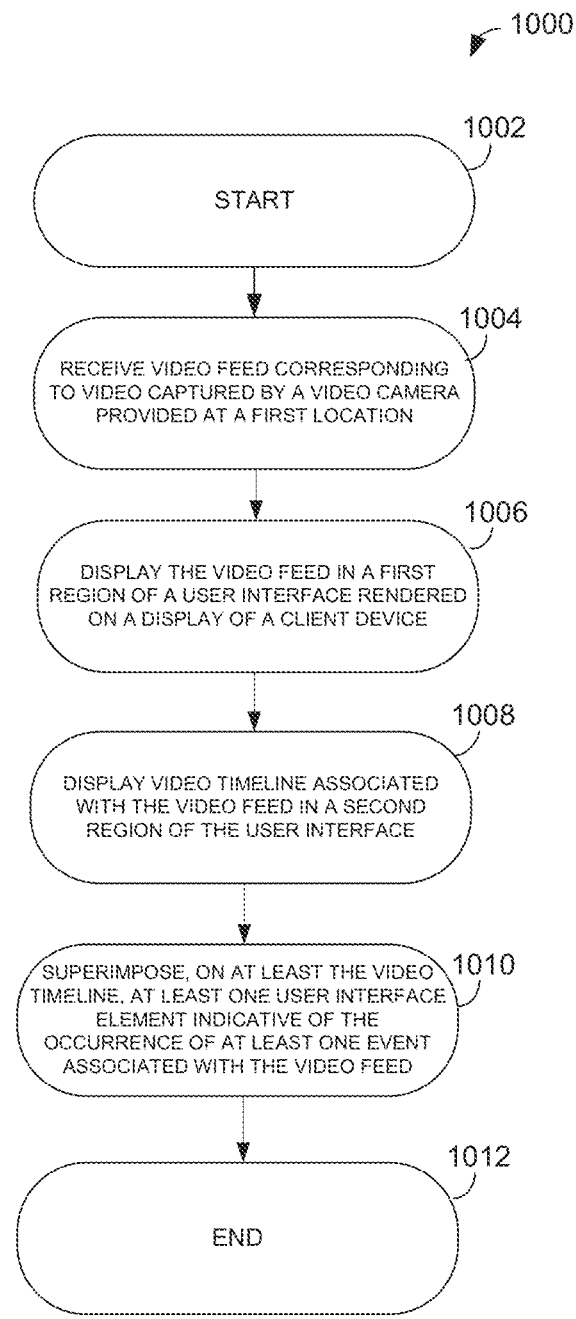
FIG. 10 is a flowchart of an example method for displaying information related to a video feed, in accordance with an illustrative embodiment.

Referring now to FIG. 10, a method 1000 for displaying information related to a video feed, such as the video feed 202 of FIG. 2A, on a user interface, such as the GUI 200 of FIG. 2A, will now be described. The user interface is rendered on a display of a client device, such as the display 126 of client device 110 illustrated in FIG. 1 or any other suitable computing device. After start (step 1002), a video feed is received at step 1004. The video feed corresponds to video captured by a video camera provided at a first location and may be received in the manner described herein above with reference to FIG. 1. At step 1006, the video feed 202 is displayed in a first region of the user interface, as described herein above with reference to FIG. 2A. The next step 1008 may then comprise displaying, in a second region of the user interface, a video timeline (such as the video timeline 204 of FIG. 2A) associated with the video feed. At step 1010, at least one user interface element 208 is superimposed on at least the video timeline, in the manner described herein above with reference to FIGS. 2A to 9. The at least one user interface element is indicative of the occurrence of at least one event associated with the video feed. As described herein above, the at least one user interface element comprises at least one pop-up element displayed at least in part in the first region of the user interface. The at least one user interface element may further comprise at least one icon displayed in a second region of the user interface. After step 1010 is completed, the method 900 may end (step 1014).

A method for displaying information related to a video feed on a user interface can include receiving the video feed, the video feed corresponding to video captured by a video camera provided at a first location, displaying the video feed in a first region of the user interface, the user interface rendered on a display of a client device located remotely from the video camera, displaying a video timeline associated with the video feed in a second region of the user interface, and superimposing, on at least the video timeline, at least one user interface element indicative of occurrence of at least one event associated with the video feed, a position of the at least one user interface element on the video timeline corresponding to a time of occurrence of the at least one event.

In the method, the at least one user interface element can comprise at least one pop-up element displayed at least in part in the first region of the user interface, the at least one pop-up element displayed automatically based on the at least one event associated with the video timeline.

In the method, the at least one pop-up element can provide first information of interest about the at least one event.

In the method, the first information of interest about the at least one event can comprise at least one of a title associated with the at least one event, a timestamp indicative of the time of occurrence of the at least one event, and a description of the at least one event.

In the method, the first information of interest about the at least one event can further comprise at least one of an icon providing a graphical representation of the at least one event, a straight-line distance between the first location and at least one second location at which the at least one event occurred, a radial distance from the first location to the at least one second location, a direction to the at least one second location, and geographical coordinates associated with the at least one second location.

In the method, the at least one pop-up element can be displayed for a pre-determined time duration.

In the method, a transparency setting of the at least one pop-up element can vary over the pre-determined time duration, from a minimum transparency to a maximum transparency.

The method can further comprise rendering second information of interest about the at least one event on the user interface in response to user interaction of a user input device with the at least one pop-up element.

In the method, the second information of interest can comprise at least one of an image associated with the at least one event, audio data associated with the at least one event, a hyperlink pointing to an external source of information relevant to the at least one event, a matrix barcode encoding a link pointing to the external source of information, a matrix barcode encoding an identifier pointing to the external source of information, and location information associated with the at least one event.

In the method, the video feed can be a recorded video feed, and the at least one pop-up element can be displayed in response to detecting that the time of occurrence of the at least one event is within a pre-determined timeframe of a current playback time of the recorded video feed.

In the method, the video feed can be a live video feed, and the at least one pop-up element can be displayed in response to detecting, in real-time and based on an event occurrence record obtained from a data source, occurrence of the at least one event.

In the method, the video feed can be a live video feed, and the at least one pop-up element can be displayed in response to detecting, in real-time and based on an event occurrence record obtained from a data source, occurrence of the at least one event within a pre-determined range of the first location.

In the method, the at least one user interface element can further comprise at least one icon displayed in the second region of the user interface adjacent to the at least one pop-up element, the at least one icon providing a graphical representation of the at least one event.

In the method, the at least one user interface element can be indicative of occurrence of the at least one event within a pre-determined range of the first location.

In the method, the video feed can be a live video feed, and the at least one pop-up element can be displayed in response to detecting, in real-time and based on an event occurrence record obtained from a data source, occurrence of the at least one event within the pre-determined range of the first location.

In the method, the at least one user interface element can comprise at least one icon displayed in the second region of the user interface, the at least one icon providing a graphical representation of the at least one event.

In the method, the at least one user interface element can comprise at least one icon, the at least one icon providing a graphical representation of the at least one event.

The method can further comprise identifying, from a set of a plurality of event types, an event type associated with the at least one event and selecting the at least one icon based on the event type as identified.

In the method, the at least one event can comprise a first event having a first event type associated therewith and at least one second event having at least one second event type associated therewith, and a first icon providing the graphical representation of the first event and at least one second icon providing the graphical representation of the at least one second event can be displayed in the second region of the user interface, the first event type different from the at least one second event type and the first icon different from the at least one second icon.

In the method, the at least one event can comprise a first event having a first event type associated therewith and at least one second event having at least one second event type associated therewith, and a first icon providing the graphical representation of the first event can be displayed in a first pop-up element displayed at least in part in the first region of the user interface and at least one second icon providing the graphical representation of the at least one second event can be displayed in at least one second pop-up element displayed at least in part in the first region of the user interface, the first event type different from the at least one second event type and the first icon different from the at least one second icon.

In the method, a plurality of icons can be superimposed on the video timeline at positions corresponding to times of occurrence of a plurality of consecutive events, and a single pop-up element can be displayed adjacent a given one of the plurality of icons, the pop-up element displaying first information of interest about the plurality of consecutive events in a stacked manner.

A system can comprise a processing unit and a non-transitory computer-readable medium having stored thereon program instructions executable by the processing unit for receiving a video feed corresponding to video captured by a video camera provided at a first location, displaying the video feed in a first region of a user interface, the user interface rendered on a display of a client device located remotely from the video camera, displaying a video timeline associated with the video feed in a second region of the user interface, and superimposing, on at least the video timeline, at least one user interface element indicative of occurrence of at least one event associated with the video feed, a position of the at least one user interface element on the video timeline corresponding to a time of occurrence of the at least one event.

In the system, the at least one user interface element can comprise at least one pop-up element displayed at least in part in the first region of the user interface, the at least one pop-up element displayed automatically based on the at least one event associated with the video timeline.

In the system, the at least one pop-up element can provide first information of interest about the at least one event.

In the system, the first information of interest about the at least one event can comprise at least one of a title associated with the at least one event, a timestamp indicative of the time of occurrence of the at least one event, and a description of the at least one event.

In the system, the first information of interest about the at least one event can further comprise at least one of an icon providing a graphical representation of the at least one event, a straight-line distance between the first location and at least one second location at which the at least one event occurred, a radial distance from the first location to the at least one second location, a direction to the at least one second location, and geographical coordinates associated with the at least one second location.

In the system, the at least one pop-up element can be displayed for a pre-determined time duration.

In the system, a transparency setting of the at least one pop-up element can vary over the pre-determined time duration, from a minimum transparency to a maximum transparency.

The program instructions can be further executable by the processing unit for rendering second information of interest about the at least one event on the user interface in response to user interaction of a user input device with the at least one pop-up element.

In the system, the second information of interest can comprise at least one of an image associated with the at least one event, audio data associated with the at least one event, a hyperlink pointing to an external source of information relevant to the at least one event, a matrix barcode encoding a link pointing to the external source of information, a matrix barcode encoding an identifier pointing to the external source of information, and location information associated with the at least one event.

In the system, the video feed can be a recorded video feed, and the at least one pop-up element can be displayed in response to detecting that the time of occurrence of the at least one event is within a pre-determined timeframe of a current playback time of the recorded video feed.

In the system, the video feed can be a live video feed, and the at least one pop-up element can be displayed in response to detecting, in real-time and based on an event occurrence record obtained from a data source, occurrence of the at least one event.

In the system, the video feed can be a live video feed, and the at least one pop-up element can be displayed in response to detecting, in real-time and based on an event occurrence record obtained from a data source, occurrence of the at least one event within a pre-determined range of the first location.

In the system, the at least one user interface element can further comprise at least one icon displayed in the second region of the user interface adjacent to the at least one pop-up element, the at least one icon providing a graphical representation of the at least one event.

In the system, the at least one user interface element can be indicative of occurrence of the at least one event within a pre-determined range of the first location.

In the system, the video feed can be a live video feed, and the at least one pop-up element can be displayed in response to detecting, in real-time and based on an event occurrence record obtained from a data source, occurrence of the at least one event within the pre-determined range of the first location.

In the system the at least one user interface element can comprise at least one icon displayed in the second region of the user interface, the at least one icon providing a graphical representation of the at least one event.

In the system, the at least one user interface element can comprise at least one icon, the at least one icon providing a graphical representation of the at least one event.

The program instructions can be further executable by the processing unit for identifying, from a set of a plurality of event types, an event type associated with the at least one event and selecting the at least one icon based on the event type as identified.

In the system, the at least one event can comprise a first event having a first event type associated therewith and at least one second event having at least one second event type associated therewith, and a first icon providing the graphical representation of the first event and at least one second icon providing the graphical representation of the at least one second event can be displayed in the second region of the user interface, the first event type different from the at least one second event type and the first icon different from the at least one second icon.

In the system, the at least one event can comprise a first event having a first event type associated therewith and at least one second event having at least one second event type associated therewith, and a first icon providing the graphical representation of the first event can be displayed in a first pop-up element displayed at least in part in the first region of the user interface and at least one second icon providing the graphical representation of the at least one second event can be displayed in at least one second pop-up element displayed at least in part in the first region of the user interface, the first event type different from the at least one second event type and the first icon different from the at least one second icon.

In the system, a plurality of icons can be superimposed on the video timeline at positions corresponding to times of occurrence of a plurality of consecutive events, and a single pop-up element can be displayed adjacent a given one of the plurality of icons, the pop-up element displaying first information of interest about the plurality of consecutive events in a stacked manner.

A non-transitory computer-readable medium can have stored thereon program instructions executable by a processor for receiving a video feed corresponding to video captured by a video camera provided at a first location, displaying the video feed in a first region of the user interface, the user interface rendered on a display of a client device located remotely from the video camera, displaying a video timeline associated with the video feed in a second region of the user interface, and superimposing, on at least the video timeline, at least one user interface element indicative of occurrence of at least one event associated with the video feed, a position of the at least one user interface element on the video timeline corresponding to a time of occurrence of the at least one event.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the disclosure, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The disclosure provides many example embodiments. Although each embodiment represents a single combination of inventive elements, other examples may include all possible combinations of the disclosed elements. Thus if one embodiment comprises elements A, B, and C, and a second embodiment comprises elements B and D, other remaining combinations of A, B, C, or D, may also be used.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The embodiments and examples described herein are illustrative and non-limiting. Practical implementation of the features may incorporate a combination of some or all of the aspects, and features described herein should not be taken as indications of future or existing product plans. Applicant partakes in both foundational and applied research, and in some cases, the features described are developed on an exploratory basis.

Although the embodiments have been described in detail, it should be understood that various changes, substitutions and alterations can be made herein without departing from the scope as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method for displaying information related to a video feed on a user interface, the method comprising:
receiving the video feed, the video feed corresponding to video captured by a video camera provided at a first location;
displaying the video feed in a first region of the user interface, the user interface rendered on a display of a client device located remotely from the video camera;
displaying a video timeline associated with the video feed in a second region of the user interface; and
superimposing, on at least the video timeline, at least one user interface element indicative of occurrence of at least one event associated with the video feed, a position of the at least one user interface element on the video timeline corresponding to a time of occurrence of the at least one event, wherein the at least one user interface element comprises at least one pop-up element displayed at least in part in the first region of the user interface, the at least one pop-up element displayed automatically based on the at least one event associated with the video timeline and providing first information of interest about the at least one event, the first information of interest comprising textual information descriptive of the at least one event and being based on an event occurrence record obtained from a data source.

2. The method of claim 1, wherein the first information of interest about the at least one event comprises at least one of a title associated with the at least one event, a timestamp indicative of the time of occurrence of the at least one event, and a description of the at least one event.

3. The method of claim 1, wherein the first information of interest about the at least one event further comprises at least one of an icon providing a graphical representation of the at least one event, a straight-line distance between the first location and at least one second location at which the at least one event occurred, a radial distance from the first location to the at least one second location, a direction to the at least one second location, and geographical coordinates associated with the at least one second location.

4. The method of claim 1, wherein the at least one pop-up element is displayed for a pre-determined time duration.

5. The method of claim 4, wherein a transparency setting of the at least one pop-up element varies over the pre-determined time duration, from a minimum transparency to a maximum transparency.

6. The method of claim 1, further comprising rendering second information of interest about the at least one event on the user interface in response to user interaction of a user input device with the at least one pop-up element.

7. The method of claim 5, wherein the second information of interest comprises at least one of an image associated with the at least one event, audio data associated with the at least one event, a hyperlink pointing to an external source of information relevant to the at least one event, a matrix barcode encoding a link pointing to the external source of information, a matrix barcode encoding an identifier pointing to the external source of information, and location information associated with the at least one event.

8. The method of claim 1, wherein the video feed is a recorded video feed, and further wherein the at least one pop-up element is displayed in response to detecting that the time of occurrence of the at least one event is within a pre-determined timeframe of a current playback time of the recorded video feed.

9. The method of claim 1, wherein the video feed is a live video feed, and further wherein the at least one pop-up element is displayed in response to detecting, in real-time and based on the event occurrence record, occurrence of the at least one event.

10. The method of claim 1, wherein the video feed is a live video feed, and further wherein the at least one pop-up element is displayed in response to detecting, in real-time and based on the event occurrence record, occurrence of the at least one event within a pre-determined range of the first location.

11. The method of claim 1, wherein the at least one user interface element further comprises at least one icon displayed in the second region of the user interface adjacent to the at least one pop-up element, the at least one icon providing a graphical representation of the at least one event.

12. The method of claim 1, wherein the at least one user interface element is indicative of occurrence of the at least one event within a pre-determined range of the first location.

13. The method of claim 11, wherein the video feed is a live video feed, and further wherein the at least one pop-up element is displayed in response to detecting, in real-time and based on the event occurrence record, occurrence of the at least one event within the pre-determined range of the first location.

14. The method of claim 11, wherein the at least one user interface element comprises at least one icon displayed in the second region of the user interface, the at least one icon providing a graphical representation of the at least one event.

15. The method of claim 1, wherein the at least one user interface element comprises at least one icon, the at least one icon providing a graphical representation of the at least one event.

16. The method of claim 14, further comprising identifying, from a set of a plurality of event types, an event type associated with the at least one event and selecting the at least one icon based on the event type as identified.

17. The method of claim 15, wherein the at least one event comprises a first event having a first event type associated therewith and at least one second event having at least one second event type associated therewith, and further wherein a first icon providing the graphical representation of the first event and at least one second icon providing the graphical representation of the at least one second event are displayed in the second region of the user interface, the first event type different from the at least one second event type and the first icon different from the at least one second icon.

18. The method of claim 15, wherein the at least one event comprises a first event having a first event type associated therewith and at least one second event having at least one second event type associated therewith, and further wherein a first icon providing the graphical representation of the first event is displayed in a first pop-up element displayed at least in part in the first region of the user interface and at least one second icon providing the graphical representation of the at least one second event is displayed in at least one second pop-up element displayed at least in part in the first region of the user interface, the first event type different from the at least one second event type and the first icon different from the at least one second icon.

19. The method of claim 1, wherein a plurality of icons are superimposed on the video timeline at positions corresponding to times of occurrence of a plurality of consecutive events, and further wherein a single pop-up element is displayed adjacent a given one of the plurality of icons, the pop-up element displaying first information of interest about the plurality of consecutive events in a stacked manner.

20. A system comprising:
   a processing unit; and
   a non-transitory computer-readable medium having stored thereon program instructions executable by the processing unit for:
      receiving a video feed corresponding to video captured by a video camera provided at a first location;
      displaying the video feed in a first region of a user interface, the user interface rendered on a display of a client device located remotely from the video camera;
      displaying a video timeline associated with the video feed in a second region of the user interface; and
      superimposing, on at least the video timeline, at least one user interface element indicative of occurrence of at least one event associated with the video feed, a position of the at least one user interface element on the video timeline corresponding to a time of occurrence of the at least one event, wherein the at least one user interface element comprises at least one pop-up element displayed at least in part in the first region of the user interface, the at least one pop-up element displayed automatically based on the at least one event associated with the video timeline and providing first information of interest about the at least one event, the first information of interest comprising textual information descriptive of the at least one event and being based on an event occurrence record obtained from a data source.

21. A non-transitory computer-readable medium having stored thereon program instructions executable by a processor for:
   receiving a video feed corresponding to video captured by a video camera provided at a first location;
   displaying the video feed in a first region of the user interface, the user interface rendered on a display of a client device located remotely from the video camera;
   displaying a video timeline associated with the video feed in a second region of the user interface; and
   superimposing, on at least the video timeline, at least one user interface element indicative of occurrence of at least one event associated with the video feed, a position of the at least one user interface element on the video timeline corresponding to a time of occurrence of the at least one event, wherein the at least one user interface element comprises at least one pop-up element displayed at least in part in the first region of the user interface, the at least one pop-up element displayed automatically based on the at least one event associated with the video timeline and providing first information of interest about the at least one event, the first information of interest comprising textual information descriptive of the at least one event and being based on an event occurrence record obtained from a data source.

22. The method of claim 1, wherein the first region is positioned in a first portion of the user interface and the second region is positioned in a second portion of the user interface, the first portion separate from the second portion.

* * * * *